United States Patent [19]
Kitagawa et al.

[11] Patent Number: 5,799,206
[45] Date of Patent: Aug. 25, 1998

[54] REMOTE PRINT SYSTEM HAVING A PLURALITY OF COMPUTERS WHICH ARE CAPABLE OF MONITORING AND CONTROLLING OPERATIONS OF A REMOTE PRINTER

[75] Inventors: Makoto Kitagawa, Fujisawa; Seiji Kageyama, Yokohama; Satoru Matsumoto, Yokohama; Takuya Shimakawa, Yokohama; Naomi Tamura, Ebina, all of Japan

[73] Assignee: Hitachi, Ltd., Tokyo, Japan

[21] Appl. No.: 418,521

[22] Filed: Apr. 7, 1995

[30] Foreign Application Priority Data

Apr. 11, 1994 [JP] Japan .................................. 6-071813

[51] Int. Cl.$^6$ .......................... G06F 15/00; G06F 13/38
[52] U.S. Cl. .................. 395/856; 395/112; 395/113; 395/114; 395/115
[58] Field of Search ................... 395/112, 856, 395/828, 831, 825, 827, 115, 113, 114

[56] References Cited

U.S. PATENT DOCUMENTS

| 3,659,271 | 4/1972 | Collins et al. ...................... 340/172.5 |
| 5,075,874 | 12/1991 | Steeves et al. ..................... 395/112 |
| 5,220,674 | 6/1993 | Morgan et al. ..................... 395/800 |
| 5,228,118 | 7/1993 | Sasaki ............................... 395/112 |
| 5,361,332 | 11/1994 | Yoshida et al. .................... 395/114 |
| 5,377,191 | 12/1994 | Ferrell et al. ..................... 370/94.1 |
| 5,528,734 | 6/1996 | Sanchez ............................. 395/115 |
| 5,550,957 | 8/1996 | Davidson, Jr. et al. ............ 395/114 |

FOREIGN PATENT DOCUMENTS

| 0 353 909 A2 | 7/1990 | European Pat. Off. ......... H04N 1/46 |
| A-2-166511 | 5/1990 | Japan . |
| A-3-150628 | 6/1991 | Japan . |
| A-3-232014 | 10/1991 | Japan . |
| A-4-18631 | 1/1992 | Japan . |
| A-4-227526 | 8/1992 | Japan . |
| A-4-277818 | 10/1992 | Japan . |
| A-4-317118 | 11/1992 | Japan . |
| A-5-27931 | 2/1993 | Japan . |
| A-5-75667 | 3/1993 | Japan . |
| A-6-67825 | 3/1994 | Japan . |

OTHER PUBLICATIONS

"Network Printing Alliance Protocol", A Printer/Host Control Specification developed by NPA, Level 1, Revision N, Feb. 11, 1994.

SCSI (ANSI X3. 131–1986, X3T9. 2/86–109) pp. 145–156.

W. Richard Stevens, "UNIX Network Programming", 1990, pp. 43–55, 87–89, 110–115 and 262–263.

Primary Examiner—Thomas C. Lee
Assistant Examiner—Rehana Perveen
Attorney, Agent, or Firm—Antonelli, Terry, Stout & Kraus, LLP

[57] ABSTRACT

A remote print system in which a plurality of computers connected to a network are each allowed to finely control a printer (NPR) connected to the network and a computer used in the remote print system. A NPR control library serves as an interface to the NPR, a message is transferred to a NPR controlling daemon under the direction of an interprocess-communication mechanism (IPC), and the NPR controlling daemon performs a requested control operation of the NPR in accordance with the message by utilizing protocol for NPR control.

2 Claims, 24 Drawing Sheets

FIG. 9

NPOPEN

FUNCTION : ESTABLISH A SESSION WITH NPR

| BYTE | CONTENTS |
|---|---|
| 0 | (char) MESSAGE CODE = 01h |
| 1 | (int) MESSAGE LENGTH = 9 |
| 2 | |
| 3 | |
| 4 | |
| 5 | (pid_t) COMMAND ISSUING PROCESS ID |
| 6 | |
| 7 | |
| 8 | |

FIG. 10

RNPOPEN

FUNCTION : RESPONSE TO NPOPEN

| BYTE | CONTENTS |
|---|---|
| 0 | (char) MESSAGE CODE = 01h |
| 1 | (int) MESSAGE LENGTH = 17 |
| 2 | |
| 3 | |
| 4 | |
| 5 | (pid_t) COMMAND ISSUING PROCESS ID |
| 6 | |
| 7 | |
| 8 | |
| 9 | (int) RETURN VALUE |
| 10 | (NORMAL=0, ABNORMAL=−1) |
| 11 | |
| 12 | |
| 13 | (int) ERROR CODE (errcode) |
| 14 | |
| 15 | |
| 16 | |

FIG. 11

NPWRITE
FUNCTION : OUTPUT PRINT DATA

| BYTE | CONTENTS |
|---|---|
| 0 | (char) MESSAGE CODE = 03h |
| 1 | (int) MESSAGE LENGTH = 13 |
| 2 | |
| 3 | |
| 4 | |
| 5 | (pid_t) COMMAND ISSUING PROCESS ID |
| 6 | |
| 7 | |
| 8 | |
| 9 | (unsigned int) TRANSFERRED DATA SIZE IN BYTES |
| 10 | |
| 11 | |
| 12 | |

FIG. 12

RNPREADY

FUNCTION : RESPONSE INDICATING THAT NPR CONTROLLING DAEMON IS READY TO RECEIVE PRINT DATA

| BYTE | CONTENTS |
|---|---|
| 0 | (char) MESSAGE CODE = 10h |
| 1 | (int) MESSAGE LENGTH = 17 |
| 2 | |
| 3 | |
| 4 | |
| 5 | (pid_t) COMMAND ISSUING PROCESS ID |
| 6 | |
| 7 | |
| 8 | |
| 9 | (int) RETURN VALUE |
| 10 | (NORMAL=0, ABNORMAL=−1) |
| 11 | |
| 12 | |
| 13 | (int) ERROR CODE (errcode) |
| 14 | |
| 15 | |
| 16 | |

FIG. 13

RNPWRITE
FUNCTION: RESPONSE TO NPWRITE

| BYTE | CONTENTS |
|---|---|
| 0 | (char) MESSAGE CODE = 03h |
| 1 | (int) MESSAGE LENGTH = 21 |
| 2 | |
| 3 | |
| 4 | |
| 5 | (pid_t) COMMAND ISSUING PROCESS ID |
| 6 | |
| 7 | |
| 8 | |
| 9 | (int) RETURN VALUE |
| 10 | (NORMAL=0, ABNORMAL=−1) |
| 11 | |
| 12 | |
| 13 | (int) ERROR CODE (errcode) |
| 14 | |
| 15 | |
| 16 | |
| 17 | (unsigned int) TRASFERRED DATA SIZE IN BYTES |
| 18 | |
| 19 | |
| 20 | |

FIG. 14

NPSENS
   FUNCTION : INQUIRE DETAILED ERROR INFORMATION

| BYTE | CONTENTS |
|---|---|
| 0 | (char) MESSAGE CODE = 0Dh |
| 1 | (int) MESSAGE LENGTH = 9 |
| 2 | |
| 3 | |
| 4 | |
| 5 | (pid_t) COMMAND ISSUING PROCESS ID |
| 6 | |
| 7 | |
| 8 | |

FIG. 15

RNPSENS
FUNCTION : RESPONSE TO NPSENS

| BYTE | CONTENTS |
|---|---|
| 0 | (char) MESSAGE CODE = 0Dh |
| 1 | (int) MESSAGE LENGTH = 41 |
| 2 | |
| 3 | |
| 4 | |
| 5 | (pid_t) COMMAND ISSUING PROCESS ID |
| 6 | |
| 7 | |
| 8 | |
| 9 | (int) RETURN VALUE |
| 10 | (NORMAL=0, ABNORMAL=−1) |
| 11 | |
| 12 | |
| 13 | (int) ERROR CODE (errcode) |
| 14 | |
| 15 | |
| 16 | |
| 17 | (struct npreqsns) DETAILED ERROR INFORMATION (24 BYTES) |
| ⋮ | |
| 40 | |

FIG. 18

| No. | NAME | OUTLINE OF FUNCTIONS |
|---|---|---|
| 1 | NPOPEN | OPEN NPR CONTROLLING SESSION |
| 2 | NPCLOSE | CLOSE NPR CONTROLLING SESSION |
| 3 | NPWRITE | OUTPUT TO NPR |
| 4 | NPCTL | CONTROL NPR |

FIG. 19

| No. | NAME | OUTLINE OF FUNCTIONS |
|---|---|---|
| 1 | PRNPSTTS | INQUIRE LATEST STATUS OF PRINTER |
| 2 | PRNPENDCHK | CONFIRM PRINT END |
| 3 | PRRESERVE | SET RESERVATION OF DATA PRESENT IN NPR CONTROLLING DAEMON |
| 4 | PRRECEIVE | INQUIRE NPWRITE RECEIVED DATA SIZE IN BYTES |
| 5 | PRRESTART | INSTRUCT TRANSFER OF RESERVED DATA |
| 6 | PRSYNCHRO | SET SYNCHRONOUS/ASYNCHRONOUS MODE OF NPWRITE |
| 7 | PRCANCEL | SUSPEND DATA TRANSFER |
| 8 | PRCLEAR | CLEAR PRINT DATA |
| 9 | PRPAPERSTTS | INQUIRE STATUS OF PRINTING PAPER |
| 10 | PRNPSENS | INQUIRE DETAILED ERROR INFORMATION |
| 11 | PRNPINQ | INQUIRE NPR DEVICE INFORMATION |
| 12 | PRRESETPAGEN | RESET PAGE NUMBER |

FIG. 20

| No. | MESSAGE NAME | MESSAGE CODE | OUTLINE OF FUNCTIONS |
|---|---|---|---|
| 1 | NPOPEN | 01h | START SESSION WITH NPR |
| 2 | NPCLOSE | 02h | END SESSION WITH NPR |
| 3 | NPWRITE | 03h | OUTPUT PRINT DATA |
| 4 | NPSTTS | 04h | INQUIRE LATEST STATUS OF PRINTER |
| 5 | NPENDCHK | 05h | CONFIRM PRINT END |
| 6 | NPRESERVE | 06h | SET RESERVATION OF DATA PRESENT IN NPR CONTROLLING DAEMON |
| 7 | NPRECEIVE | 07h | INQUIRE RECEIVED DATA SIZE IN BYTES |
| 8 | NPRESTART | 08h | INSTRUCT TRANSFER OF RESERVED DATA |
| 9 | NPSYNCHRO | 09h | SET SYNCHRONOUS/ASYNCHRONOUS MODE OF NPWRITE |
| 10 | NPCANCEL | 0Ah | SUSPEND DATA TRANSFER |
| 11 | NPCLEAR | 0Bh | CLEAR PRINT DATA |
| 12 | NPPAPERSTTS | 0Ch | INQUIRE STATUS OF PRINTING PAPER |
| 13 | NPSENS | 0Dh | INQUIRE DETAILED ERROR INFORMATION |
| 14 | NPINQ | 0Eh | INQUIRE DETAILED ERROR INFORMATION |
| 15 | NPRSTPAGEN | 0Fh | RESET PAGE NUMBER |
| 16 | NPPOLL | 41h | POLLING |

FIG. 21

LIST OF NPR CONTROLLING DAEMON RESPONSE MESSAGES

| No. | MESSAGE NAME | MESSAGE CODE | OUTLINE OF FUNCTIONS |
|---|---|---|---|
| 1 | RNPOPEN | 01h | RESPOND TO "START SESSION WITH NPR" |
| 2 | RNPCLOSE | 02h | RESPOND TO "END SESSION WITH NPR" |
| 3 | RNPWRITE | 03h | RESPOND TO "OUTPUT PRINT DATA" |
| 4 | RNPSTTS | 04h | RESPOND TO "INQUIRE LATEST STATUS OF PRINTER" |
| 5 | RNPENDCHK | 05h | RESPOND TO "CONFIRM PRINT END" |
| 6 | RNPRESERVE | 06h | RESPOND TO "SET RESERVATION OF DATA IN NPR CONTROLLING DAEMON" |
| 7 | RNPRECEIVE | 07h | RESPOND TO "INQUIRE RECEIVED DATA SIZE IN BYTES" |
| 8 | RNPRESTART | 08h | RESPOND TO "INSTRUCT TRANSFER OF RESERVED DATA" |
| 9 | RNPSYNCHRO | 09h | RESPOND TO "SET SYNCHRONOUS/ASYNCHRONOUS MODE OF NPWRITE" |
| 10 | RNPCANCEL | 0Ah | RESPOND TO "SUSPEND DATA TRANSFER" |
| 11 | RNPCLEAR | 0Bh | RESPOND TO "CLEAR PRINT DATA" |
| 12 | RNPPAPERSTTS | 0Ch | RESPOND TO "INQUIRE STATUS OF PRINTING PAPER" |
| 13 | RNPSENS | 0Dh | RESPOND TO "INQUIRE DETAILED ERROR INFORMATION" |
| 14 | RNPINQ | 0Eh | RESPOND TO "INQUIRE NPR DEVICE INFORMATION" |
| 15 | RNPRSTPAGEN | 0Fh | RESPOND TO "RESET PAGE NUMBER" |
| 16 | RNPREADY | 10h | RESPOND TO INDICATE "NPR IS READY TO RECEIVE DATA" |
| 17 | RNPPOLL | 41h | RESPOND TO "POLLING" |

FIG. 22A

| FUNCTION OF NPR CONTROL COMMANDS | NPR CONTROL COMMANDS NAME | COMMAND CODE | SUB-COMMANDS INVOLVED IN COMMAND DATA AREA | REMARKS |
|---|---|---|---|---|
| (a) PROGRAM DOWNLOAD | PROGRAM DOWNLOAD | 05h | NONE | DOWNLOAD NPR CONTROLLING PROGRAM |
| (b) FONT DOWNLOAD | FONT LOAD | 06h | NONE | LOAD FONT IN NPR |
| (c) QUERY | READY STATUS | 00h | | CHECK IF NPR IS OPERABLE |
| | QUERY PRINTER TYPE | 12h | NONE | QUERY PRINTER TYPE |
| | QUERY PARAMETER | 1Ah | | QUERY NPR PARAMETER |
| | QUERY PRINTER CONTROLLER STATUS | 03h | | QUERY NPR STATUS |
| (d) PDL SPECIFYING | PDL SPECIFYING | | | |
| (e) SET PRINTING CONDITIONS | SINGLE/DOUBLE SIDE PRINTING SPECIFYING | 0Ah | PRESENT, PDL ETC | SET PRINTING CONDITIONS |
| | DOUBLE SIDE PRINTING TERMINATION SPECIFYING | | | |
| | PAPER-SUPPLY-UNIT SPECIFYING | | | |
| | PAPER EJECT UNIT SPECIFYING | | | |
| | PAPER SIZE SPECIFYING | PRINT | | |
| | PRINT ORIENTATION (PORTRAIT/LANDSCAPE) SPECIFYING | | | |
| | PAPER VERTICAL/HORIZONTAL DIRECTION SPECIFYING | | | |
| | COPY-COUNT SPECIFYING | | | |
| | PRINT-START PAGE NUMBER SPECIFYING | | | |
| | RESET PAGE NUMBER | | | |
| | CONSTRAINED/UNCONSTRAINED COMMAND SPECIFYING | | | |
| | SET PRINTER MODE | MODE SELECT | 15h | NONE | SET PRINTER MODE OF PROCESSING |
| | PRINT ALL BUFFER DATA | FLUSH BUFFER | 10h | NONE | PRINT OUT ALL DATA PRESENT IN BUFFER OF NPR |
| | | FLUSH BUFFER2 | | | |

FIG. 22B

| FUNCTION OF NPR CONTROL COMMANDS | | NPR CONTROL COMMANDS | COMMAND CODE | SUB-COMMANDS INVOLVED IN COMMAND DATA AREA | REMARKS |
|---|---|---|---|---|---|
| CLASSIFICATION | NAME | | | | |
| (f) DRAWING | TEXT OUTPUT | PRINT | 0Ah | PRESENT, PURSUANT TO PDL | INSTRUCT DRAWING |
| | IMAGE OUTPUT | | | | |
| | GRAPHICS OUTPUT | | | | |
| (g) INSTRUCT PRINTING | INSTRUCT PRINTING | PRINT | 0Ah | DITTO | INSTRUCT PRINTING |
| (h) URGENT REQUEST FROM HOST COMPUTER TO NPR | SUSPEND | STOP PRINT HOLD BIT =1 (SUSPEND), 0 (CANCEL) | 1Bh | NONE | SUSPEND (HOLD BIT "1") OR CANCEL (HOLD BIT "0") PRINT BY NPR |
| | CANCEL | | | | |
| | RESUME | CONTINUE PRINT | 19h | NONE | RESUME PRINT PROCESSING BY NPR |
| (i) POLLING FROM HOST COMPUTER TO NPR | POLLING | POLL | 01h | NONE | QUERY IF THERE IS INFORMATION TO NPR |
| (j) END SESSION | END SESSION | END SESSION | 07h | NONE | INSTRUCT DISCONNECTION AND SOCKET RELEASE |
| | | END SESSION2 | 07h | NONE | INSTRUCT DISCONNECTION AND SOCKET RELEASE, TURN OFF USED FLAG |
| (k) SELF DIAGNOSIS | INSTRUCT EXECUTION OF SELF-DIAGNOSIS | SEND DIAGNOSTIC | 1Dh | NONE | INSTRUCT NETWORK PRINTER TO EXECUTE SELF-DIAGNOSIS |
| | INSTRUCT REPORT ON SELF-DIAGNOSIS RESULT | RECEIVE DIAGNOSTIC RESULT | 1Ch | | ASK FOR REPORT ON SELF-DIAGNOSIS RESULT |

PDL : PAGE DISCRIPTION LANGUAGE   (NOTE 1) (a)~(c), (h)~(j) : IMMEDIATE PROCESSING COMMAND  (d)~(g), (k) : DELAYED PROCESSING COMMAND

FIG. 23

| No. | CODE | STATUS NAME | MEANING/USAGE |
|---|---|---|---|
| 1 | 00h | GOOD | NPR COMMAND IS COMPLETED NORMALLY |
| 2 | 02h | CHECK CONDITION | THERE IS INFORMATION TO HOST COMPUTER |
| 3 | 03h | CHECK CONDITION WITH GOOD FLAG | NPR COMMAND IS COMPLETED NORMALLY BUT THERE IS INFORMATION TO HOST COMPUTER WHEN ERROR IS DETECTED BY NPR DURING EXECUTION OF "PRINT" COMMAND. NPR CONTINUES RECEIVING DATA UNDER DIRECTION OF THE "PRINT" COMMAND AND RETURNS PRESENT STATUS AT THE TIME THAT THE COMMAND ENDS. |
| 4 | 08h | BUSY | COMMAND BUFFER IN NPR IS FILLED UP AND FAILS TO RECEIVE ISSUED DELAYED PROCESSING COMMAND. (HOST COMPUTER SHOULD ISSUE COMMAND AFTER A WHILE.) |
| 5 | 09h | USED | NPR IS USED BY ANOTHER HOST COMPUTER |
| 6 | 0Ah | RTR (READY TO RECEIVE) | COMPLETION OF PREPARATION FOR RECEPTION OF DATA IS INFORMED TO COMMAND (SUCH AS PRINT COMMAND) FOR SENDING VARIABLE LENGTH DATA. |

REMOTE PRINT SYSTEM HAVING A PLURALITY OF COMPUTERS WHICH ARE CAPABLE OF MONITORING AND CONTROLLING OPERATIONS OF A REMOTE PRINTER

BACKGROUND OF THE INVENTION

The present invention relates to remote print systems and computers used therein and more particularly it relates to a remote print system in which when a plurality of computers connected to a network (hereinafter referred to as host computers) cause a printer connected to the network (hereinafter referred to as a network printer or NPR) to execute printing, the host computers are capable of recognizing the status of the network printer and control the operation thereof and to a computer used in the remote print system.

In recent years, a remote print system in which a printer is used in common to a plurality of host computers connected to a network has become widespread. This type of remote print system is described in, for example, JP-A-4-317118 and JP-A-3-232014.

A general, conventional example of the remote print system in which a printer is used in common to a plurality of host computers connected to a network will now described with reference to FIG. 17.

In the example of FIG. 17, a network printer 120 connected to a network 100 is used in common to a host computer 110 and another host computer (not shown), which are connected to the network 100, to execute printing.

Although in FIG. 17 only one host computer 110 and only one network printer (hereinafter referred to as NPR) 120 are shown, the system may be composed of a plurality of host computers and a plurality of NPR's.

The host computer 110 is a computer which causes the NPR 120 to execute printing. The host computer 110 includes a print job generating program 118 for generating a print job on the basis of data such as a document file, a spool 111 for queuing the print job, a print job sending process 1703 for taking out the print job queued in the spool 111 and sending the print job to the NPR 120, a transmission control protocol/internet protocol(TCP/IP) 117, and a socket interface 116 through which the print job sending process 1703 utilizes the TCP/IP to perform communication.

The NPR 120 is a printer which receives the print job from the network 100 to execute printing. The NPR 120 includes a print job receiving process 1701 for receiving the print job from the network 100, a print process 1702 for printing print data in accordance with an instruction in the received print job, a drawing/printing unit 122 for performing the processing of drawing and printing the print data, a TCP/IP 117, and a socket interface 116.

In the host computer 110, the print job generating program 118 generates a print job on the basis of document data and queues the data in the spool 111. In personal computers and work stations, a document generating application program and a lpr command process correspond to the print job generating program 118. During remote printing based on a line printer daemon (lpd), the lpd receives a print job from another host computer connected to the network 100 and writes the received data into the spool 111. In this case, the lpd also corresponds to the print job generating program 118.

When a print job is present in the spool 111, the print job sending process 1703 takes out the print job and utilizes the TCP/IP 117 to send the print job to the NPR 120 through the socket 116 in accordance with protocol for print job transfer.

In the NPR 120, on the other hand, the print job receiving process 1701 utilizes the TCP/IP 117 through the socket 116 to receive a print job from the network 100 in accordance with the protocol for print job transfer and transfers the print job to the print process 1702. The print process 1702 transfers the print data supplied from the print job receiving process 1701 to the drawing/printing unit 122 to cause it to draw the print data and control a printer mechanism so as to execute printing.

In some cases, a spool may be provided in the NPR 120 and the print job receiving process 1701 may queue the print job in the spool, so that the print process 1702 can start printing when the print job is present in the spool.

The sequence of generation, sending, reception and printing of the print job described as above can be realized by using, for example, the lpd (line printer daemon) and lpd protocol (request for comments 1179).

In the conventional remote print system described as above, the host computer 110 has only a function to send a print job to the NPR 120 and does not have a function to finely control the operation of the printer to cause it to execute printing.

Further, when sending the print job, the host computer can know an error which has occurred before the sending of the print job but cannot know an error which has occurred after the print job sending or during printing.

Furthermore, the host computer 110 cannot check details of the operational status of the NPR 120 and an error therein.

On the other hand, in the conventional printing based on a local printer connected to the host computer 110 through the use of a SCSI (ANSI X3.131-1986, X3T9.2/86-109, pp.145–156), fine operational control such as suspension, resumption and cancellation of printing can be ensured and details of device information on the printer such as letter font, emulation of page description language, precision of printing and paper size, details of power supply interruption and stand-by status, details of errors, such as lack of paper, paper jam, lack of toner, cover open, misprint, lack of font and non-coincidence of emulation, and details of operation status of, for example, a paper cassette selected presently and a paper outputting tray selected presently can be known.

A method for checking the status of the local printer and an error therein, the local printer being connected to the host computer 110 as described above, is described in, for example, JP-A-2-166511.

A technique disclosed in the JP-A-2-166511 will now be described in brief.

In the technique, when a printer detects a change in status of the printer and an error therein, it sets the detected contents in a memory means of its own (polling response data unit). A host computer has a means (printer supervisor) for supervising the status of the printer in order that the host computer can check the status of the printer by carrying out the sequence as below between the printer supervisor and the printer.

(1) The host computer sends, at a polling period of sufficiently short interval of time, to the printer a command for checking whether the detected contents is set in the polling response data unit.

(2) Upon receipt of the command, the printer responds to the host computer to inform the host computer whether the detected contents is set in the polling response data unit ("presence"/"absence").

(3) When receiving "presence" from the printer, the host computer sends to the printer a command for instructing the printer to send the detected contents which is set in the polling response data unit.

(4) Upon receipt of the command, the printer sends to the host computer the detected contents as response data.

In this manner, according to the technique described in JP-A-2-166511, the host computer can check the status of the printer.

In the case of causing the local printer to execute printing, the host computer can check the status of the printer by utilizing the above function and in the event that normal printing is not carried out, it can inform the user of host computer 110 of a cause of an error and conduct the error recovery processing such as re-sending of a print job.

In the conventional remote print system, however, the host computer 110 cannot know details of the cause of the error and cannot effect fine printer control, with the result that the host computer fails to conduct error recovery processing as can be effected in the case of causing the local printer to execute printing. In addition, since the removal of the cause of an error in the NPR 120 is not effected, the NPR 120 is forced to keep waiting for the removal the cause of the error, raising a problem that the NPR 120 is prevented from executing printing during an interval of the waiting time.

In such an event, if the NPR 120 is near the user of host computer 110 who has requested printing, the user can check printing conditions while watching the NPR 120, but if the NPR 120 is placed at a location which is remote from the user, it is difficult for the user to check printing conditions.

On the other hand, with recent widespread use of the network, a system which utilizes a network so that a high speed, highly precise printer may be used in common to many computers and in this type of system, it is of importance that the user can easily check printing conditions of the printer located remote from the user.

Reference may further be made to the following publications.

JP-A-4-18631 discloses a printer having a protocol to send/receive data and directly connectable to a network. No explanation is provided in this publication regarding controlling of printer operation.

JP-A-4-227526 discloses transmitting a fault message from a printer to a workstation. No controlling of printer operation however is executed.

JP-A-4-277818 discloses a printer which is capable of suspending, stopping and resuming printing in response to a request from an apparatus located remotely, via a server. No explanation is however provided regarding specific means, such as a library (or a system call) for controlling a network printer and daemon (or a driver).

JP-A-5-27931 shows providing each client with a virtual interface so as to allow the clients to perform printing in a manner as if a printer is connected to each client. No reference is made to controlling of printer operation.

JP-A-5-75667 discloses transmitting a fault message from a printer to a server and from the server to a client. No reference to controlling of printer operation however is made.

JP-A-6-67825 discloses allowing a host computer to grasp the status of processing executed in a remote printer by using a separate session for status reporting. No explanation is made regarding controlling of printer operation in this publication.

JP-A-3-150628 shows receiving a request for demanding the use of a printer from a host computer and, when the printer is being used, transmitting an error notification to indicate that the printer is being used and otherwise, permitting the use of the printer, via display controlling apparatus. The display controlling apparatus has a controlling block in association with a corresponding host computer to manage the use status of a printer. In contrast, in the present invention a flag within a printer is used to manage such a status, as will be understood from the disclosure, among other differences.

SUMMARY OF THE INVENTION

A first object of the present invention is to solve the above problems by providing a remote print system in which a process in a host computer requesting printing can easily know the status of a network printer and details of an error therein and providing a printer used in the remote print system.

A second object of the present invention is to provide a remote print system in which when printing based on a network printer is carried out, a process in a host computer requesting printing can control the network printer in a way similar to that for a local printer connected to the host computer and to provide a computer used in the remote print system.

A third object of the present invention is to provide a remote print system in which when printing based on a network printer is carried out, a process in a host computer requesting printing can cause the network printer to execute printing by using an interface similar to a conventional interface for a local printer connected to the host computer and to provide a computer used in the remote print system.

To accomplish the above first and second objects, according to one aspect of the present invention, a host computer carries a NPR control library which serves as an interface to a NPR and a NPR controlling daemon for controlling the operation of the NPR through a network, and the NPR includes a NPR connecting protocol controlling unit which communicates with the NPR controlling daemon in accordance with NPR connecting protocol for control of the NPR.

According to a feature of the invention, a NPR controlling daemon command/response message is provided by which the NPR control library and the NPR controlling daemon transmit/receive a request from a print process and a result of the request. The NPR control library performs transmission and reception of the request from the print process and the result of the request to and from the NPR controlling daemon by utilizing interprocess communication (IPC) under the direction of the NPR controlling daemon command/response message.

Also, according to another feature of the invention, the NPR controlling daemon utilizes transmission control protocol/internet protocol (TCP/IP) to communicate with the NPR connecting protocol controlling unit in accordance with NPR connecting protocol for control of the NPR. Further, the NPR control library is allowed to have the function equivalent to that of the conventional printer driver.

To accomplish the above third object, according to another aspect of the present invention, the host computer includes a NPR driver for controlling the NPR, the print process issues system calls to the NPR driver, and the NPR driver transmits and receives a request from the print process and a result of the request to and from the NPR controlling daemon under the direction of a NPR controlling daemon command/response message. In one embodiment, the NPR driver is allowed to have the function equivalent to that of the conventional printer driver for the local printer.

Namely, in a remote print system and a computer used therein according to another feature of the present invention, the remote print system is made up of a network, a plurality of computers connected to the network to communicate with each other and a plurality of printers connected to the network, wherein at least one of the plurality of computers causes at least one of the plurality of printers to execute printing; the computer has a library which serves as an interface to the printer, and a NPR controlling daemon process for controlling the printer by interpreting a requested control operation in accordance with a function of the library; and the printer has a NPR connecting protocol controlling unit which communicates with the NPR controlling daemon process through the network in accordance with protocol for printer control so as to perform an instructed control operation. Specifically, in the remote print system according to another feature of the present invention, the library of the computer has the function equivalent to that of a printer driver for an interface to a local printer and controls the printer through the network. Also, in the remote print system according to another feature of the present invention, the library of the computer sends a command message to the NPR controlling daemon process and the NPR controlling daemon process of the computer processes the command message to send a response message to the library, whereby the library and the NPR controlling daemon process perform interprocess communication to control printing by the printer.

According to another aspect of the present invention, in a remote print system and a computer used therein, the remote print system is made up of a network, a plurality of computers connected to the network to communicate with each other, and a plurality of printers connected to the network, wherein at least one of the plurality of computers causes at least one of the plurality of printers to execute printing; the computer has a library which serves as an interface to the printer, and a NPR controlling daemon process for controlling the printer by interpreting a requested control operation in accordance with a function of the library, whereby the library and the NPR controlling daemon process perform interprocess communication; and the NPR controlling daemon process processes a command message received from the library and sends a response message to the process which has sent the command message so that a signal may be sent to the process to instruct it to receive the response message.

According to still another aspect of the present invention, in a remote print system and a computer used therein, the remote print system is made up of a network, a plurality of computers connected to the network to communicate with each other, and a plurality of printers connected to the network, wherein at least one of the plurality of computers causes at least one of the plurality of printers to execute printing; the computer has a library which serves as an interface to the printer, and a NPR controlling daemon process for controlling the printer by interpreting a requested control operation in accordance with a function of the library; and a communication path is provided which transfers print data independently of a communication path for transferring a command message and a response message between the library and the NPR controlling daemon process, so that even during transfer of the print data, the command message and the response message can be transferred.

According to still another aspect of the present invention, in a remote print system and a computer used therein, the remote print system is made up of a network, a plurality of computers connected to the network to communicate with each other, and a plurality of printers connected to the network, wherein at least one of the plurality of computers causes at least one of the plurality of printers to execute printing; the computer has a NPR controlling daemon process, and a library serving as an interface for causing the printer to execute printing and including a connection requesting unit for requesting a connection to the NPR controlling daemon process, a command message sending unit for sending a command message, a response message receiving unit for receiving a response message, and a printing data sending unit for sending print data, the NPR controlling daemon process being adapted to control the printer by interpreting a requested control operation in accordance with a function of the library.

According to still another aspect of the present invention, in a remote print system having a network, a plurality of computers connected to the network to communicate with each other, and a plurality of printers connected to the network, wherein at least one of the plurality of computers causes at least one of the plurality of printers to perform printing, the computer has a printer driver which serves as an interface to the printer and a NPR controlling daemon process for controlling the printer by interpreting a requested control operation under the direction of the printer driver, and the printer has a NPR connecting protocol controlling unit for communicating with the NPR controlling daemon process through the network in accordance with protocol for printer control so as to perform an instructed control operation. Specifically, in the computer of the remote print system according to a feature of the present invention, the printer driver sends a command message to the NPR controlling daemon process and the NPR controlling daemon process processes the command message to send a response message to the printer driver, whereby the printer driver and the NPR controlling daemon process perform interprocess communication so as to control printing by the printer. Also, in the printer driver in the computer of the remote print system according to a feature of the present invention, an interface is provided which sends the command message to the NPR controlling daemon process, receives a response message and sends print data to the printer to cause it to execute printing.

According to still another aspect of the present invention, in a remote print system and a computer used therein, the remote print system is made up of a network, a plurality of computers connected to the network to communicate with each other and a plurality of printers connected to the network, wherein at least one of the plurality of computers causes at least one of the plurality of printers to execute printing, and the computer has a library which serves as an interface to the printer, and a NPR controlling daemon process for controlling the printer by interpreting a requested control operation in accordance with a function of the library such that the NPR controlling daemon process permits a first one of a plurality of open requests to the printer to control the printer but does not permit the other requests to control the printer.

According to still another aspect of the present invention, in a remote print system and a computer used therein, the remote print system is made up of a network, a plurality of computers connected to the network to communicate with each other and a plurality of printers connected to the network, wherein at least one of the plurality of computers causes at least one of the plurality of printers to execute printing, and the computer has a library or printer driver which serves as an interface to the printer and a NPR controlling daemon process for controlling the printer by interpreting a requested control operation under the direction of the library or the printer driver, thereby causing the printer to execute printing. Specifically, in the NPR controlling daemon process of the remote print system according to a feature of the present invention, a first one of a plurality of open requests to the printer is permitted to control the printer but the other open requests are not permitted to control the printer. Also, the printer of the remote print system according to a feature of the present invention has a NPR connecting protocol controlling unit for performing an instructed control operation by communicating with the NPR daemon controlling process through the network in accordance with protocol for printer control.

According to still another aspect of the present invention, a printer in a remote print system is made up of a NPR connecting protocol controlling unit connected to a network and adapted to communicate with a NPR controlling daemon process through the network in accordance with protocol for printer control to perform an instructed control operation, whereby the printer communicates with a computer to perform printing.

In the remote print system according to one aspect of the present invention, the NPR control library utilizes IPC (interprocess communication) between that library and the NPR controlling daemon to transmit and receive a request from the print process and a result of the request to and from the NPR controlling daemon in accordance with a NPR controlling daemon command/response message, and the NPR controlling daemon communicates with the NPR connecting protocol controlling unit in accordance with NPR connecting protocol for control of the NPR.

The NPR control library has the function equivalent to that of the conventional printer driver and therefore, even when printing based on a network printer is carried out, a process of a host computer requesting printing can know the status of the network printer and details of an error, so that the network printer can be controlled in a manner similar to that for the local printer connected to the host computer.

Alternatively, in the remote print system according to another aspect of the present invention, the NPR driver may be provided in place of the NPR control library in order that the NPR driver can transmit and receive a request from the print process and a result of the request to and from the NPR controlling daemon in accordance with a NPR controlling daemon command/response message and so the NPR driver can have the function equivalent to that of the conventional printer driver for local printer. In this case, the process of the host computer requesting printing can cause either the local printer or the network printer connected to the host computer to execute printing under the same system control without changing the contents of the process by merely changing a device file name of the printer drive.

BRIEF DESCRIPTION OF THE DRAWINGS

FIG. 9 is a diagram showing a format of a NPOPEN message.

FIG. 10 is a diagram showing a format of a RNPOPEN message.

FIG. 11 is a diagram showing a format of a NPWRITE message.

FIG. 12 is a diagram showing a format of a RNPREADY message.

FIG. 13 is a diagram showing a format of a RNPWRITE message.

FIG. 14 is a diagram showing a format of a NPSENS message

FIG. 15 is a diagram showing a format of a RNPSENS message.

FIG. 18 shows a table of library functions.

FIG. 19 shows a table of npctl library functions.

FIG. 20 shows a table of NPR controlling daemon command messages.

FIG. 21 shows a table of NPR controlling daemon response messages.

FIG. 22A and 22B are diagrams showing a table of NPR connecting protocol commands.

FIG. 23 shows a table of NPR connecting protocol statuses.

DESCRIPTION OF THE PREFERRED EMBODIMENTS

The present invention will now be described by way of example with reference to the accompanying drawings.

Figure 1:
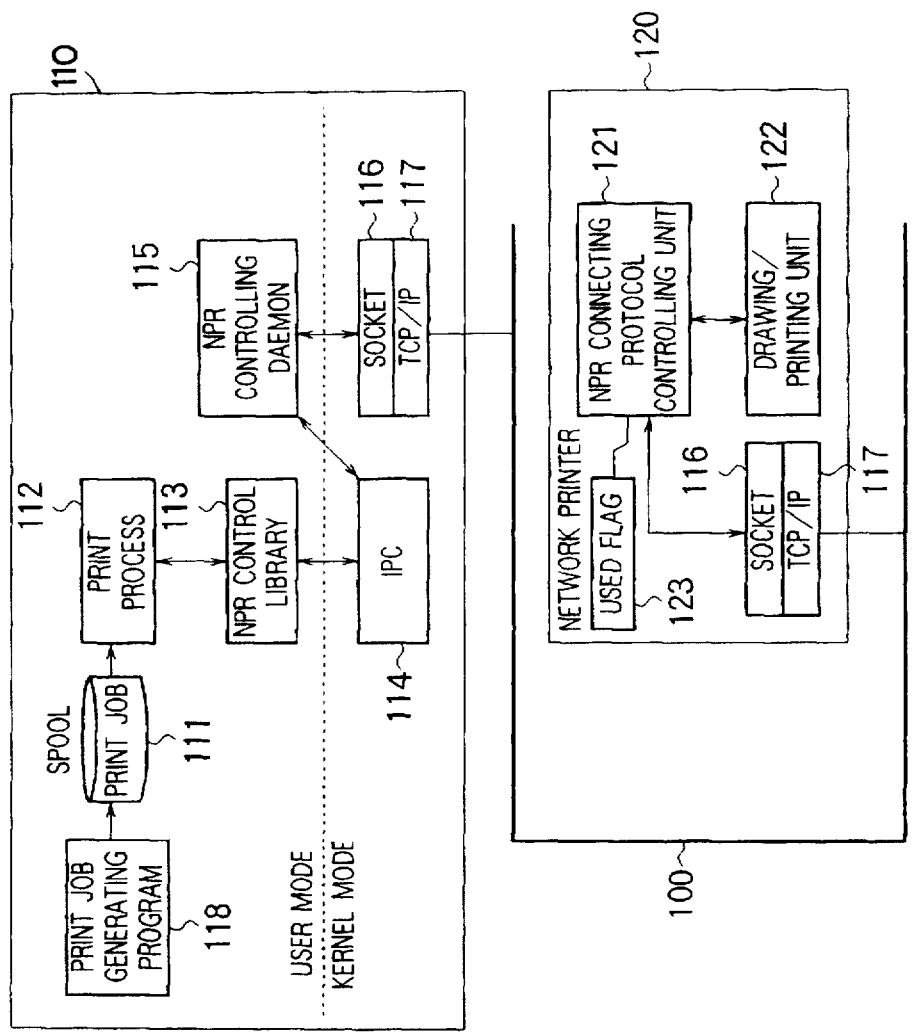
FIG. 1 is a block diagram showing the construction of a remote print system according to a first embodiment of the present invention.

Referring now to FIGS. 1 to 13, a first embodiment of the present invention will first be described. FIG. 1 is a block diagram showing the construction of a remote print system according to the first embodiment of the present invention.

Shown in FIG. 1 is an example where a host computer 110 connected to a network 100 causes a network printer (NPR) 120 to execute a print job generated from data such as a document file. Although in FIG. 1 only one host computer 110 and only one NPR 120 are depicted, the system may comprise a plurality of host computers and a plurality of NPR's.

The host computer 110 controls the operation of the NPR 120 so as to cause it to execute printing. The host computer 110 includes a print job generating program 118 for generating a print job on the basis of data in, for example, a document file, a spool 111 for queuing the print job, a print process 112 for taking out the print job queued in the spool 111 and printing print data in the print job in accordance with a format instructed in the print job, a NPR control library 113 serving as an interface to the NPR 120, a NPR controlling daemon 115 for communicating with the NPR 120 through the medium of the network 100 to control the operation of the NPR 120, an interprocess-communication mechanism (IPC) serving as a communication means between the print process 112 and the NPR controlling daemon 115, transmission control protocol/internet protocol (TCP/IP) 117 serving as a communication means between the host computer 110 and the NPR 120, and a socket interface 116 for permitting the process operating in a user mode to perform communication by utilizing the TCP/IP. The IPC (interprocess-communication mechanism) is known and described in, for example, NUIX "NETWORK PROGRAMMING" by W. Richard Stevens, 1990, pp.87–89 (corresponding to pp.105–106 of Japanese language version).

The NPR 120 is a printer which receives a command for control and data from the network 100 to execute printing. The NPR 120 includes a NPR connecting protocol controlling unit 121 for conducting communication necessary to control the operation of the NPR 120, a USED flag 123 for indicating that the printer is in use, a drawing/printing unit 122 for performing the processing of drawing and printing print data, a TCP/IP 117, and a socket interface 116.

In FIG. 1, the print job generating program 118 generates a print job on the basis of document data and queues it in the spool 111. In personal computers and work stations, a document generating application program and a lpd process correspond to the print job generating program 118. During remote print by a lpd, the lpd receives a print job from another host computer connected to the network 100 and writes the print job in the spool 111. The lpd in this case also corresponds to the print job generating program 118.

When a print job is present in the spool 111, the print process 112 utilizes the NPR control library 113 to cause the NPR 120 to execute printing. The NPR control library 113 is a library serving as an interface for causing the NPR to execute printing and consists of a function group as shown in FIG. 18. In FIG. 18, npopen (open NPR controlling session), npclose (close NPR controlling session), npwrite (output to NPR) and npctl (control NPR) functions correspond to open, close, write and ioctl system calls used for a conventional printer device driver, respectively. The print process 112 can cause the NPR 120 to execute printing by using these functions in place of the system calls used for the conventional printer device driver. The NPR control library 113 sends to the NPR controlling daemon 115 via the IPC 114 command messages as shown in FIG. 20 which are NPOPEN (establish a session with NPR), NPCLOSE (end a session with NPR), NPWRITE (output printing data), NPSTTS (inquire latest status of printer), NPENDCHK (confirm print end), NPRESERVE (set reservation of data in NPR controlling daemon), NPRECEIVE (inquire receive data size in bytes), NPRESTART (instruct transfer of reserved data), NPSYNCHRO (set synchronous/ asynchronous mode of npwrite), NPCANCEL (suspend data transfer), NPCLEAR (clear printing data), NPPAPERSTTS (inquire status of printing paper), NPSENS (inquire detailed error information), NPINQ (inquire NPR device information), NPRSTPAGEN (reset page number) and NPPOLL (polling), and transmits to the NPR controlling daemon 115 a control operation requested by the print process 112.

The NPR controlling daemon 115 is a process which receives a command message from the print process 112 to control the operation of the NPR 120 in accordance with the command message. When the daemon 115 ends the requested processing in accordance with the command message, it transmits a response message as shown in FIG. 21 to the print process 112.

The NPR controlling daemon 115 also operates to interpret the command message from the print process 112, communicate with the NPR 120 and perform the processing corresponding to the command message.

Used for communication with the NPR 120 is NPR connecting protocol necessary to control the operation of the NPR 120 so as to cause it to execute printing. The NPR connecting protocol is protocol which transfers a NPR connecting command/status for NPR control by utilizing the TCP/IP. The NPR connecting protocol commands are shown in FIGS. 22A and 22B. The NPR connecting protocol statuses are shown in FIG. 23.

The NPR controlling daemon 115 sends a NPR connecting protocol command shown in FIGS. 22A and 22B to the NPR connecting protocol controlling unit 121 through the network 100 and recognizes from a status shown in FIG. 23 a result of the processing by the command.

The NPR controlling daemon 115 and NPR connecting protocol controlling unit 121 transfer the protocol command and the status by utilizing the TCP/IP 117. The socket interface 116 serves as an interface necessary for utilization of the TCP/IP 117.

The NPR connecting protocol controlling unit 121 interprets the protocol command received from the network 100, controls the drawing/printing unit 122 to cause it to execute printing, and sends a status indicative of a result of the processing to the NPR control daemon 115.

An embodiment using a computer carrying a UNIX operating system as the host computer 110 will be described hereunder with reference to FIGS. 2 to 13. (UNIX is a registered trademark in the United States and other countries, licensed exclusively through X/Open Company Limited.)

Figure 2:
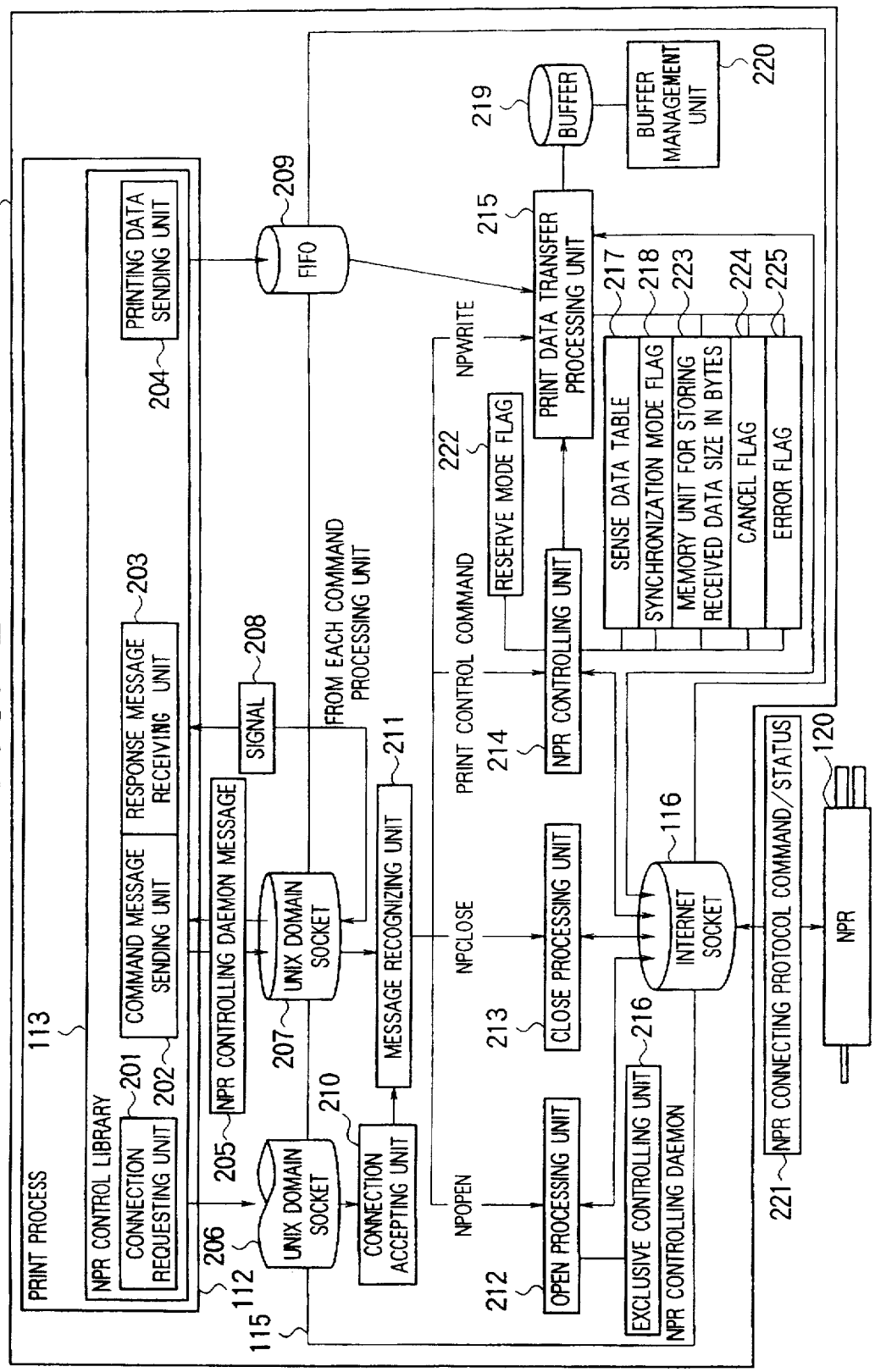
FIG. 2 is a block diagram showing an embodiment of a host computer in the first embodiment of the present invention.

FIG. 2 is a diagram showing an embodiment of the host computer 110 in the first embodiment of the present invention. In FIG. 2a, known UNIX domain and FIFO (First In First Out) are utilized exemplarily as the IPC in the UNIX. The UNIX domain and FIFO are described in UNIX "NETWORK PROGRAMMING" by W. Richard Stevens, pp.262–263 and pp.110–115, respectively (corresponding to pp.309–315 and pp.130–137, respectively of Japanese language version). As shown in FIG. 2, the NPR control library 113 includes a connection requesting unit 201 for starting communication by utilizing a UNIX domain socket, a command message sending unit 202 for sending a command message shown in FIG. 20, a response message receiving unit 203 for receiving a response message shown in FIG. 21, and a printing data sending unit 204 for sending print data which is generated from, for example, a document file by the print process 112.

The NPR controlling daemon 115 on the other hand includes a connection accepting unit 210 for starting communication by utilizing the UNIX domain socket, a message recognizing unit 211 for receiving a command message shown in FIG. 20 to start a corresponding processing, an open processing unit 212 for performing the processing of NPOPEN, a close processing unit 213 for performing the processing of NPCLOSE, a print data transfer processing unit 215 for performing the processing of NPWRITE, the NPOPEN, NPCLOSE and NPWRITE processes corresponding to the command messages shown in FIG. 20, a NPR controlling unit 214 for processing the other command messages than the NPOPEN, NPCLOSE and NPWRITE, an exclusive controlling unit 216 for preventing a plurality of print processes 112 from simultaneously accessing the NPR 120 to cause it to execute printing, a sense data table 217 for reserving a status of the NPR, a synchronization mode flag 218 for setting a mode of timing for ending a npwrite function, a memory unit 223 for storing receive data size in bytes for reserving a data size in bytes received from the npwrite function, a cancel flag 224 for indicating that the print process 112 responds to a npctl (NPCANCEL) to request print suspension, an error flag 225 for indicating that a fault occurs during printing, a reserve mode flag 222 for setting a mode for reservation of data in a buffer 219 during the occurrence of an error or during the suspension of printing, the buffer 219 being adapted to store print data received from the print process, and a buffer management unit 220 for managing use conditions of the buffer 219. The NPR control library 113 and the NPR controlling daemon 115 utilize various kinds of information as above so as to perform the setting and confirmation of the mode, the cancellation and the detection of a fault.

The buffer management unit 220 is comprised of, for example, a pointer for indicating a byte number counted from the buffer head in the buffer 219, the pointer including a buffer head pointer for indicating the head of the buffer 219, a buffer end pointer for indicating a position of the end of the buffer 219, a write start pointer for indicating a position at which a write operation to the buffer 219 is started, a write end pointer for indicating a position at which the write operation ends, a read start pointer for indicating a position at which a read operation from the buffer 219 is started, and a data end pointer for indicating a position of the end of the data.

The print process 112 and the NPR controlling daemon 115 transfer a command message of FIG. 20 and a response message of FIG. 21 by using a UNIX domain socket 207 and print data by using the FIFO 209. The NPR controlling daemon 115 and the NPR 120 also use an internet socket 116 to transfer a NPR connecting protocol command and a status 221.

In the FIG. 2 embodiment, the print process 112 and NPR controlling daemon 115 use the UNIX domain socket and FIFO as the IPC to conduct interprocess communication, but a pipe, a message queue and a common memory may be used in place of the UNIX domain sockets and FIFO. When a common memory is used instead of the FIFO 209, the common memory may be utilized as the buffer 219 to play not only the role of a transfer means for print data, but also the role of a buffer, thereby reducing the number of data copy operations.

FIGS. 4 to 8 are diagrams showing the message sequence when the print process 112 causes the NPR 120 to execute printing.

When the print process 112 causes the NPR 120 to execute printing, it first calls for a npopen function of the library functions of FIG. 18 (401). The npopen function utilizes the connection requesting unit 201 of the NPR control library 113 and issues a connection request to the UNIX domain socket 206 in order to start communication with the NPR controlling daemon 115.

In the NPR controlling daemon 115, the connection accepting unit 210 is always ready to receive connection requests from the print process 112 so that connection to the print process 112 may be established, and the UNIX domain socket 207 for transferring a NPR control daemon message is allotted to a new connection. (424)

Next, the npopen function utilizes the command message sending unit 202 to send a NPOPEN message 407 of FIG. 20 to the NPR controlling daemon 115 through the UNIX domain socket 207. The NPOPEN message 407 has a format as shown in FIG. 9 which consists of a message code 01h for identifying the kind of a message, a message length for indicating the size in bytes (number of bytes) of the message and a command issuing process id for indicating a process id of the print process 112.

In the NPR controlling daemon 115, the message recognizing unit 211 receives the NPOPEN message 407 from the UNIX domain socket 207, recognizes the kind of a command in accordance with the message command, and starts the open processing unit 212 for processing the NPOPEN message 407.

The open processing unit 212 utilizes the exclusive controlling unit 216 to check whether the NPR 120 is used by another print process and if the NPR is not used, communication with the NPR 120 is started.

Figure 3:
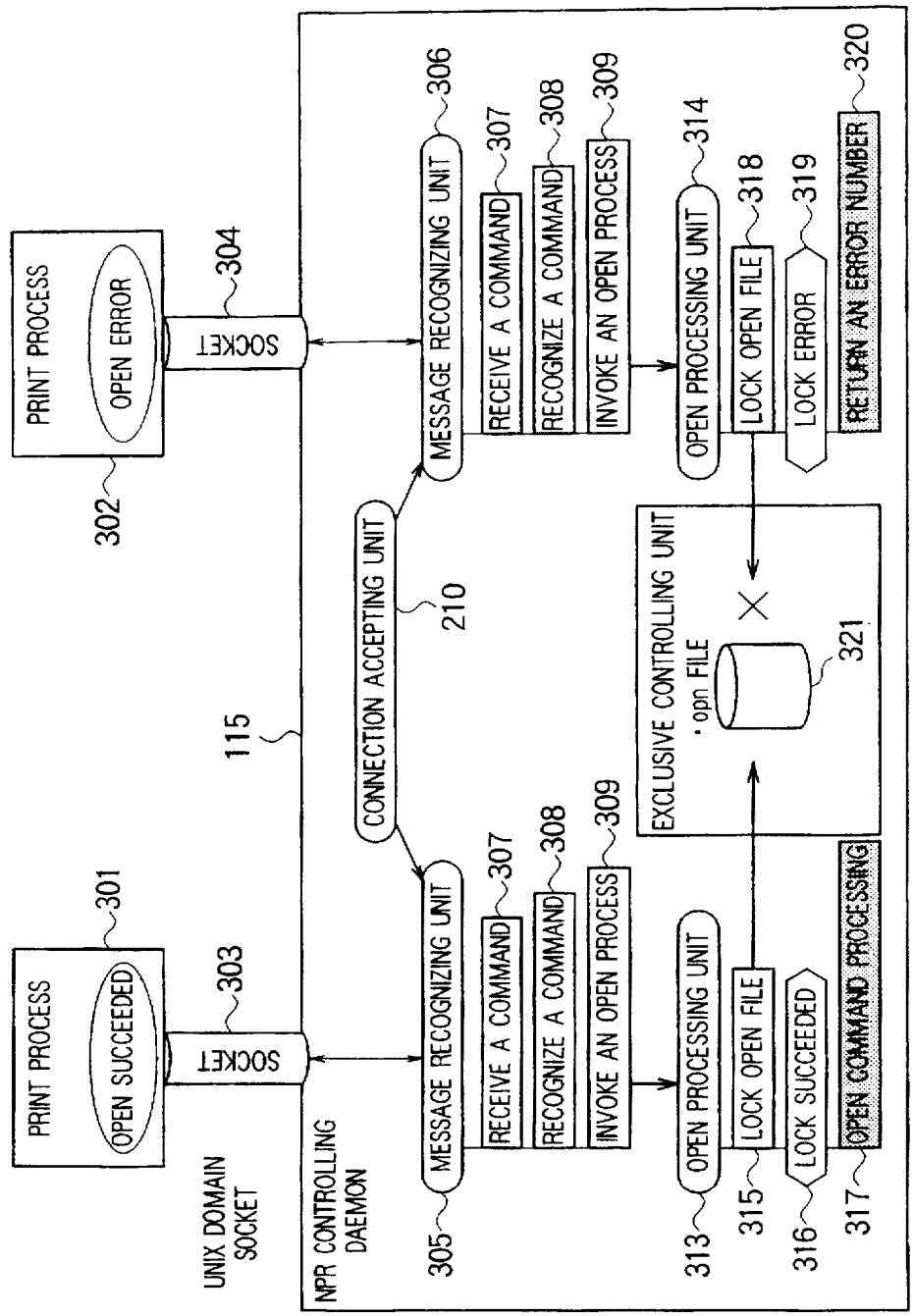
FIG. 3 is a block diagram showing an embodiment of an exclusive controlling unit in FIG. 2.
Figure 4:
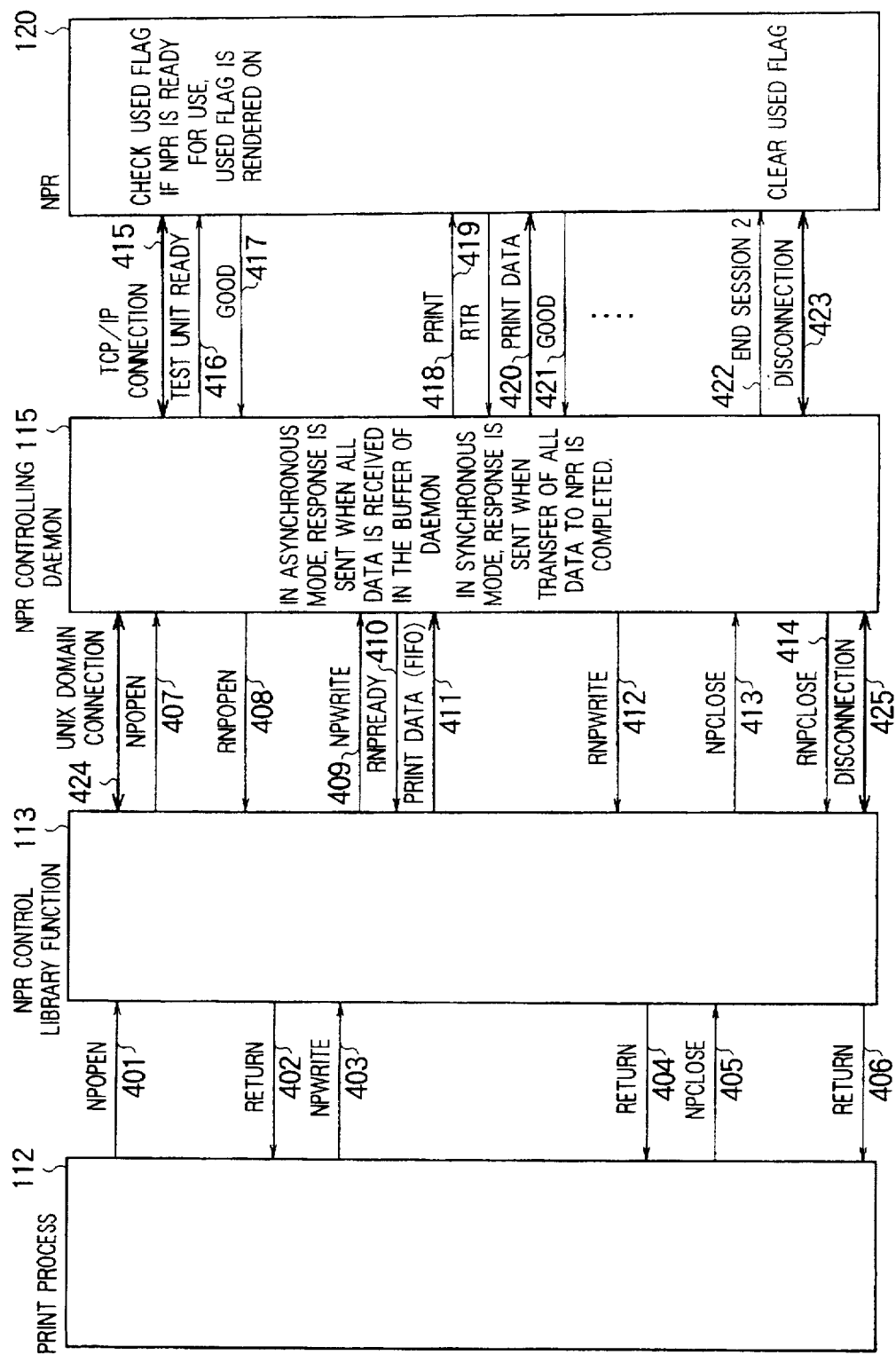
FIG. 4 is a diagram showing a message sequence when a print process causes a NPR to execute printing.
Figure 5:
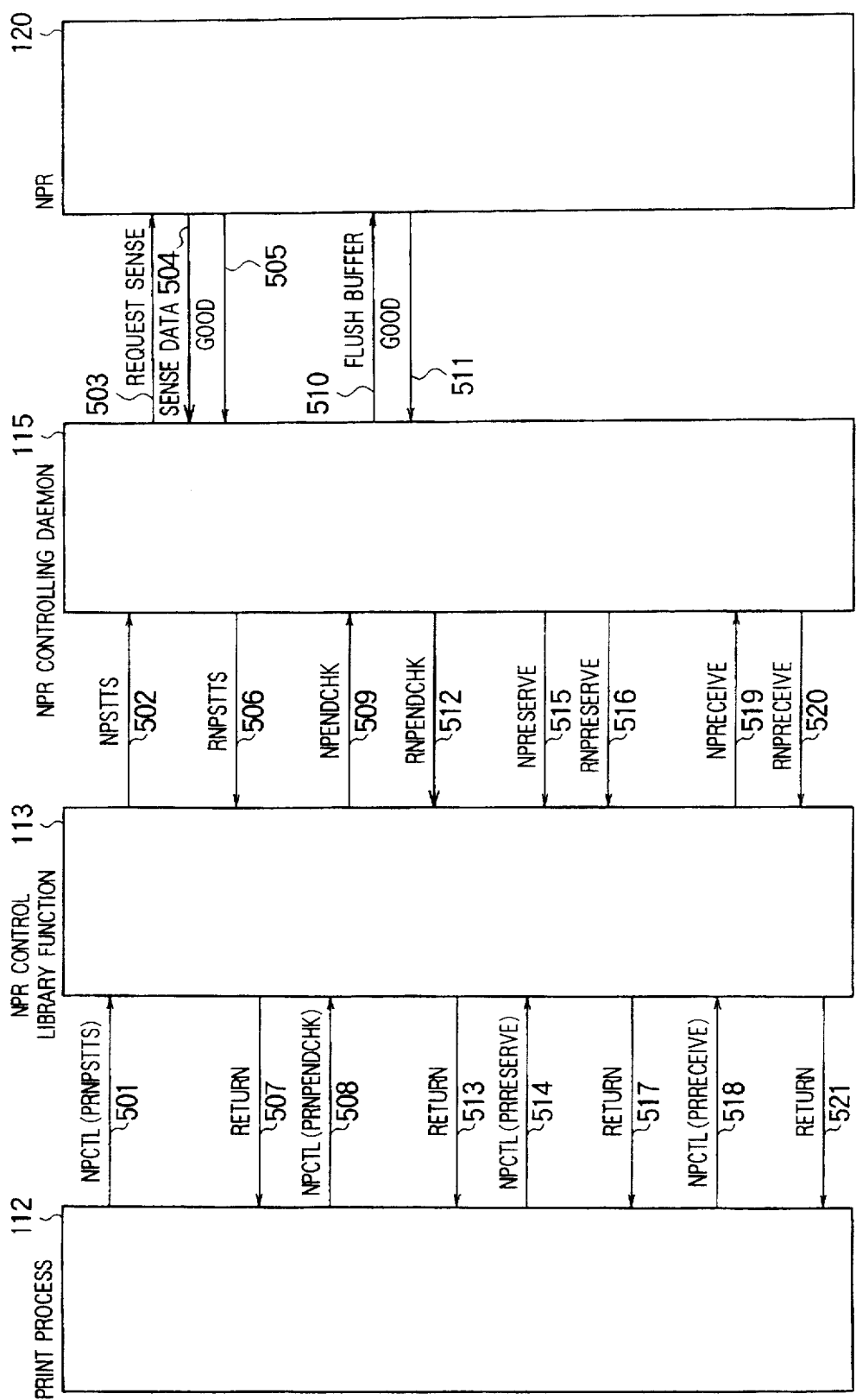
FIG. 5 is a diagram showing a message sequence when a print process causes a NPR to execute printing.
Figure 6:
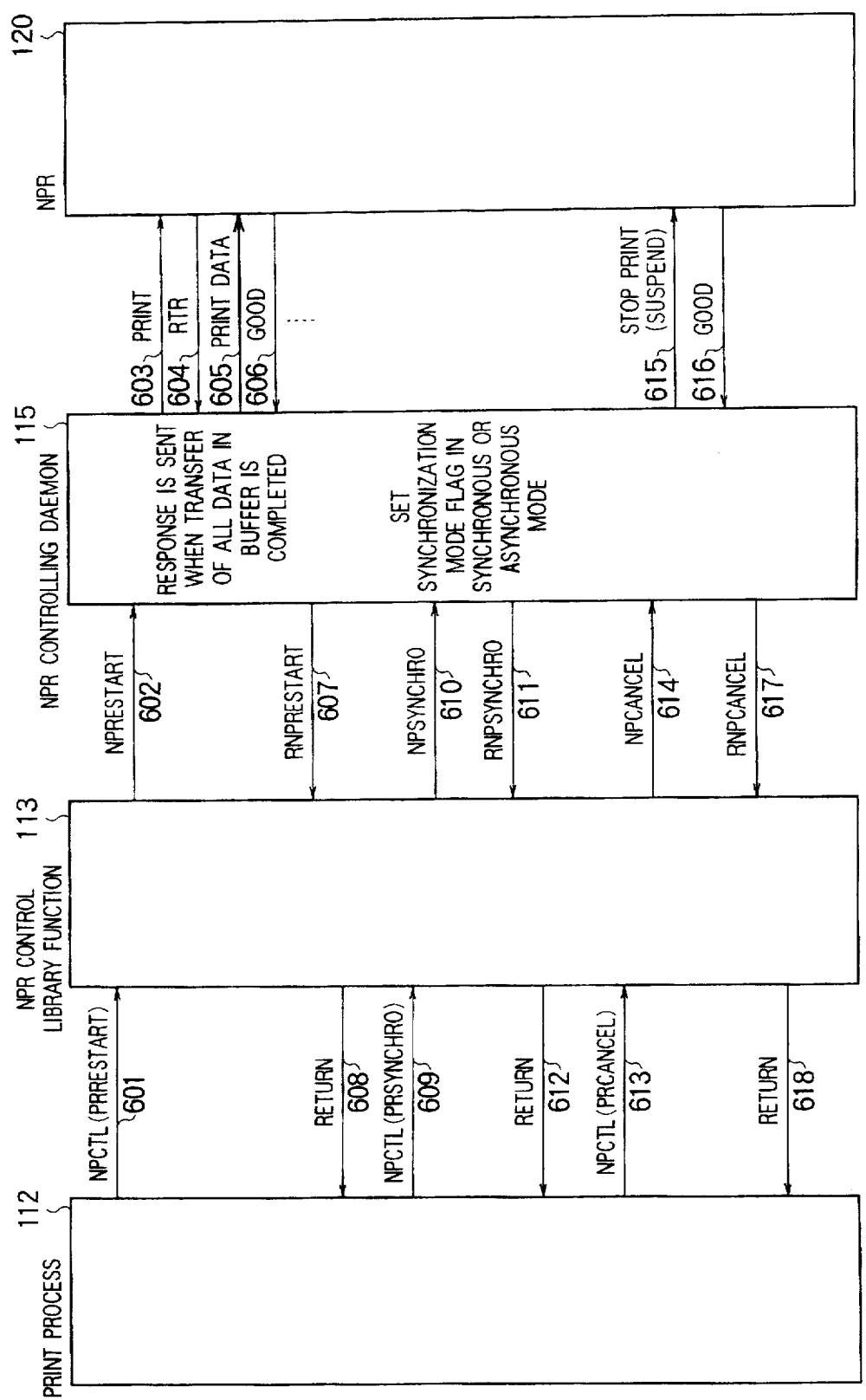
FIG. 6 is a diagram showing a message sequence when a print process causes a NPR to execute printing.
Figure 7:
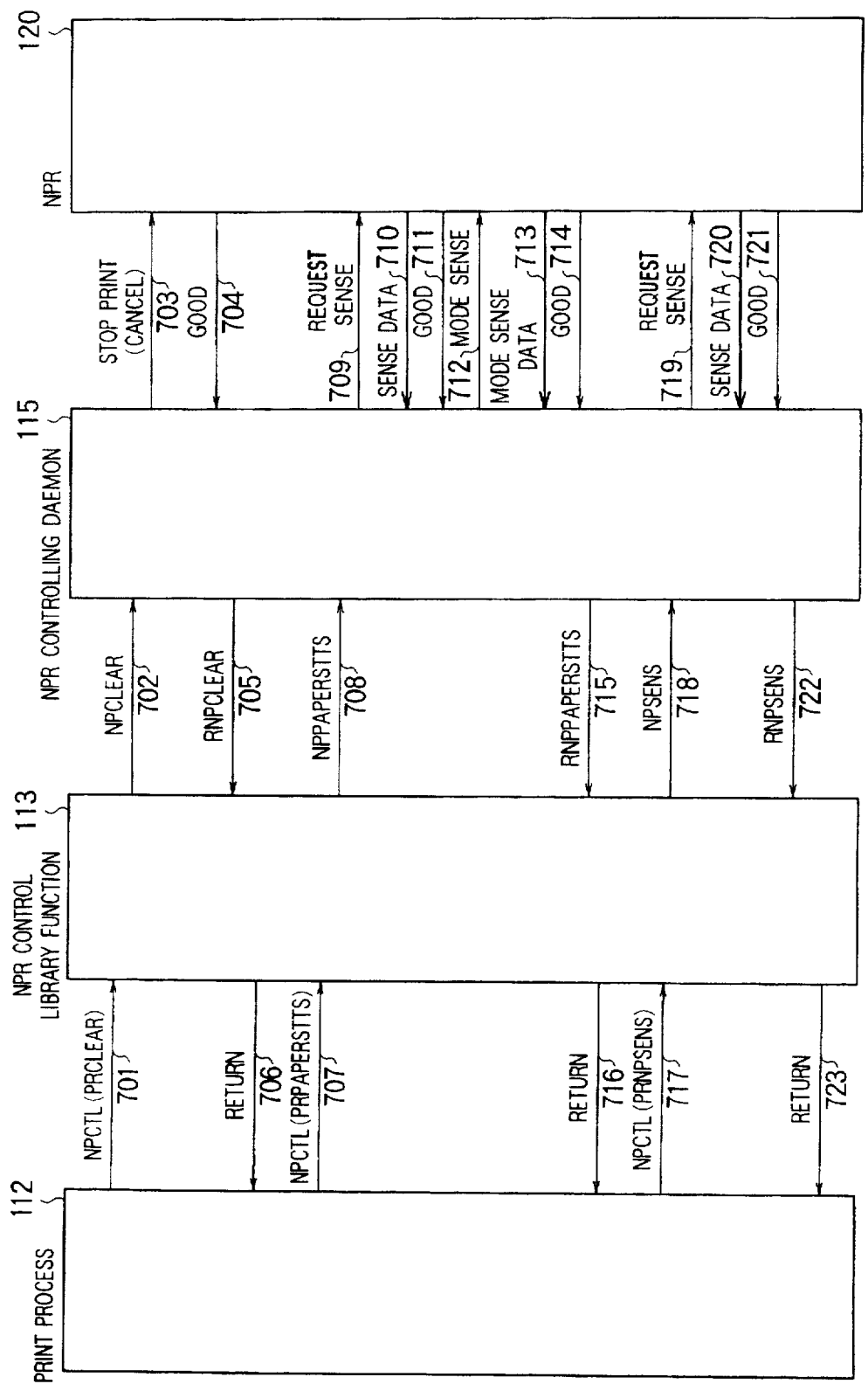
FIG. 7 is a diagram showing a message sequence when a print process causes a NPR to execute printing.
Figure 8:
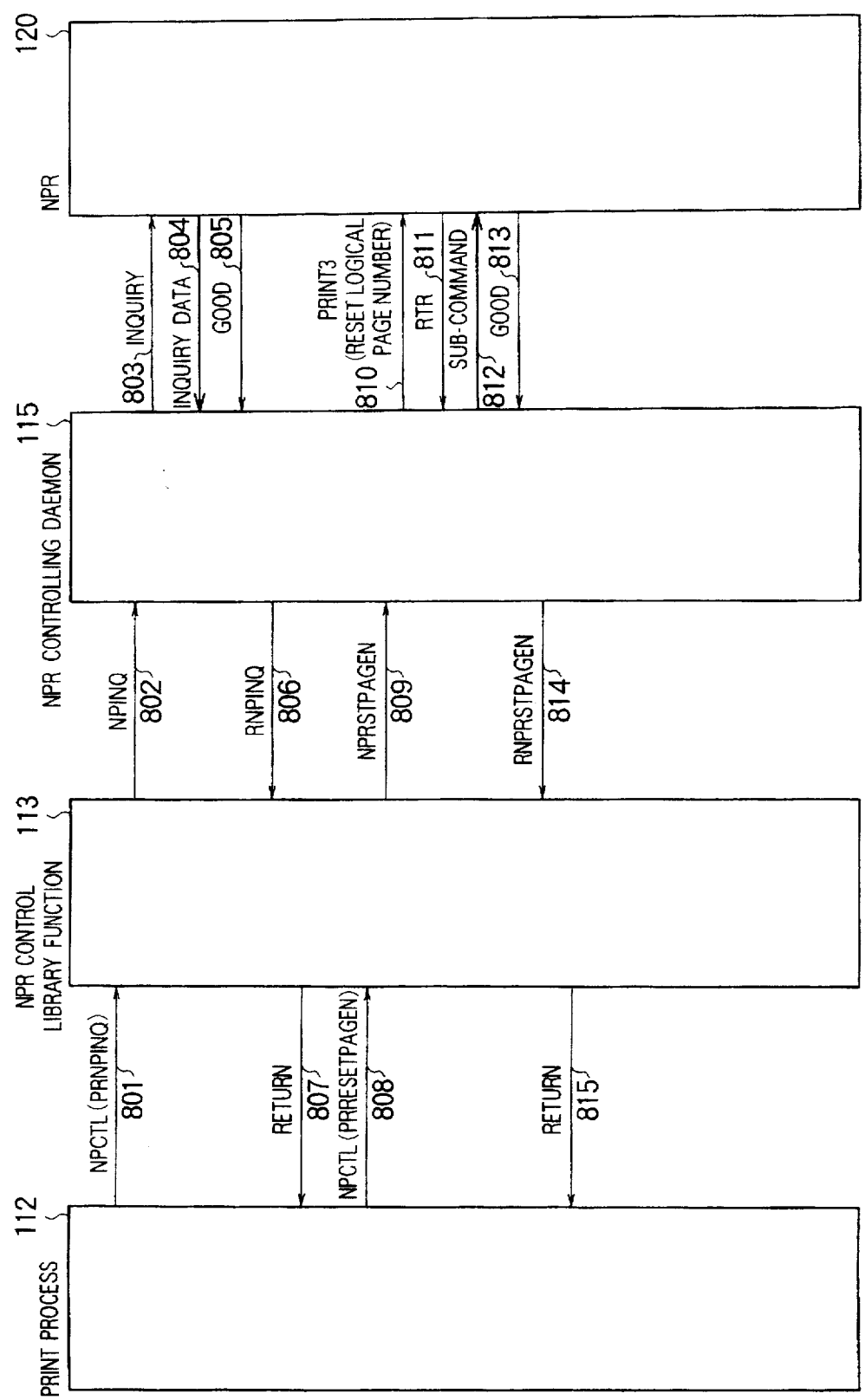
FIG. 8 is a diagram showing a message sequence when a print process causes a NPR to execute printing.

FIG. 3 shows an embodiment of the exclusive control unit 216 wherein a file 321 and a UNIX file lock mechanism are used to put the exclusive control unit 216 into practice. Specifically, the embodiment of FIG. 3 is directed to the case where print processes 301 and 302 simultaneously cause the NPR 120 to start printing.

The print processes 301 and 302 issue connection requests to the NPR controlling daemon 115. The connection accepting unit 210 accepts the connection requests from the print processes 301 and 302 to establish connections, allots sockets 303 and 304 to the processes, respectively, and starts message recognizing units 305 and 306.

The message recognizing unit 305 receives a NPOPEN message from the socket 303 (S307), recognizes the kind of the command (S308) and invokes an open processing unit 313 (S309). The message recognizing unit 306 receives a NPOPEN message from the socket 304 (S310), recognizes the kind of the command (S311) and invokes an open processing unit 314 (S312).

The open processing unit 313 locks the .opn file 321 of the exclusive control unit 216 (S315) and when the locking succeeds (S316), it performs an open command processing (S317). On the other hand, when the open processing unit 314 tries to lock the .opn file 321 of the exclusive control unit 216 (S318), locking the .opn file 321 fails because the .opn file 321 has previously been locked by the open processing unit 313 (S319). In this case, the open processing unit 314 returns an error number to the print process 302 (S320).

The locking applied to the .opn file 321 is released by the close processing unit 213.

While in the FIG. 3 embodiment the exclusive control unit 216 is exemplarily practiced by using the file 321 and file lock mechanism, the exclusive control unit 216 may alternatively be constituted by on/off operating a semaphore or providing a flag in the form of a common memory and on/off operating the flag.

When acquiring the right to access the NPR 120 through the exclusive controlling as described above, the open processing unit 212 establishes a TCP/IP connection through the internet socket 116 in order to start communication with the NPR 120 (415) and sends a TEST UNIT READY command of FIG. 22A (416).

When the NPR 120 having the USED flag 123 receives the TEST UNIT READY command under the condition that the flag is rendered off to indicate that the NPR 120 is ready for use, it renders the flag on to inhibit an access from another NPR controlling daemon, and sends a GOOD status 417 of FIG. 23 to the NPR controlling daemon 115 which has issued the TEST UNIT READY command 416. When the NPR 120 has been occupied, a USED status of FIG. 23 is sent.

When receiving the GOOD status 417 from the NPR 120, the open processing unit 212 sends a RNPOPEN message 408 of FIG. 21 to the npopen function.

The RNPOPEN message 408 has a format as shown in FIG. 10 which consists of a message code 01h for identifying the kind of a message, a message length for indicating the number of bytes of the message, a command issuing process id for indicating a process id of the print process 112 which has issued the NPOPEN message 407, a return value for indicating whether the command ends normally, and an error code for indicating a cause of an error.

The npopen function receives the RNPOPEN message 408 of FIG. 21 from the NPR controlling daemon 115 through the UNIX domain socket 207 under the direction of the response message receiving unit 203. At that time, the NPR controlling daemon issues a signal to the process which has issued the command to instruct that process to receive the status (208). This permits the print process to perform another processing without waiting for reception of a response message after issuance of the command message. The NPR control library and NPR controlling daemon may be constructed without using the status reception instruction based on the signal. In this case, the NPR control library waits for reception of a status after a command message has been issued. The signal is known and described in, for example, UNIX "NETWORK PROGRAMMING" by W. Richard Stevens, pp.43–55 (corresponding to pp.54–68 of Japanese language version).

In the present embodiment the NPR controlling daemon 115 issues a signal to instruct the print process to receive the status. In an alternative, however, the print process may check the UNIX domain socket 207 for its reception of the status at intervals of constant time.

While the command issuing process id is used as one constituent element of the NPR controlling daemon message, a sequential number or a numerical value calculated randomly may be used as the one constituent element if the correspondence between the command message and the response message can be discriminated.

The npopen function confirms the contents of the RNPOPEN message 408 and when the message code is 01h and the command issuing process id coincides with a process id of its own, it returns to the print process 112 a return value as a function value (402) and sets an error code to an external variable errno.

When the npopen function is returned normally, the print process 112 calls a npwrite, a npctl function or a npclose function of FIG. 18 in accordance with the purpose and controls the NPR 120 to cause it to execute a print job.

In the case of transfer of print data, the print process 112 calls a npwrite function (403). The npwrite function utilizes the command message sending unit 202 to send a NPWRITE message 409 of FIG. 20 to the NPR controlling daemon 115 through the UNIX domain socket 207.

The NPWRITE message 409 has a format as shown in FIG. 11 which consists of a message code 03h for identifying the kind of a message, a message length for indicating the number of bytes of a message, a command issuing process id for indicating a process id of the print process, and a transferred data size in bytes for indicating the number of bytes of print data to be transferred.

The message recognizing unit 211 of the NPR controlling daemon 115 receives the NPWRITE message 409 from the UNIX domain socket 207, recognizes the kind of the command on the basis of the message code, and invokes the print data transfer processing unit 215 for processing the NPWRITE message 409.

The printing data transfer processing unit 215 calculates the number of bytes present between the write start pointer and write end pointer of the buffer management unit 220 and when the buffer 219 is unoccupied by a byte number indicated by the NPWRITE message 409, it is rendered ready to inquire print data from the FIFO 209 and sends a RNPREADY message 410 of FIG. 21 to the npwrite function through the UNIX domain socket 207.

The RNPREADY message 410 has a format as shown in FIG. 12 which consists of a message code 10h for identifying the kind of a message, a message length for indicating the number of bytes of the message, a command issuing process id for indicating a process id of the print process 112 which has issued the NPWRITE message 409, a return value for indicating whether the command ends normally, and an error code for indicating a cause of an error. When the buffer 219 is not unoccupied sufficiently, the printing data transfer processing unit 215 sets the return value of RNPREADY message 410 to "−1", sets a code indicating that the buffer is not unoccupied to the error code, and sends the code to the npwrite function.

When receiving the RNPREADY message 410, the npwrite function writes print data contained in the print job into the FIFO 209 (411). The print data transfer processing unit 215 reads the print data from the FIFO 209, stores the data in the buffer 219, advances the write start pointer of the buffer management unit 220 by a byte number of the print data stored in the buffer 219, and reserves the byte number (data size in bytes) of the received print data in the memory for storing receiving data size in bytes 223.

Then, the print data transfer processing unit 215 confirms a value of the synchronization mode flag 218. The synchronous/asynchronous mode is a mode for 20 setting a timing for the npwrite function to return. In the case of the asynchronous mode, the print data transfer processing unit 215 sends the npwrite function to the RNPWRITE message 412 to the npwrite function at the time that read of the print data ends. In the case of the synchronous mode, the RNPWRITE message 412 is sent to the npwrite function after the print data has been sent to the NPR 120.

The RNPWRITE message 412 has a format as shown in FIG. 13 which consists of a message code 03h for identifying the kind of a message, a message length for indicating the number of bytes of the message, a command issuing process id for indicating a process id of the print process 112, a return value for indicating whether the command ends normally, an error code for indicating a cause of an error, and a transferred data size in bytes for indicating the number of bytes of print data actually received by the buffer 219 under the direction of the print data transfer processing unit 215.

Print data is sent to the NPR 120 in accordance with the following sequence.

(1) The NPR controlling daemon 115 checks the contents of the cancel flag 224 and error flag 225 and when the both flags are off, it sends a PRINT command 418 to the NPR 120.

(2) When the NPR 120 is ready to receive print data, a ready to receive (RTR) status 419 is sent to the NPR controlling daemon 115.

(3) The NPR controlling daemon 115 sends print data 420 to the NPR 120.

(4) The NPR 120 sends a GOOD status 421 to the NPR controlling daemon 115.

In an alternative sequence, the RTR status 419 may not be transferred and the NPR controlling daemon may send print data following the PRINT command 418.

When receiving the RNPWRITE message 412, the npwrite function checks the contents of the RNPWRITE message 412 and when the message code is 03h and the command issuing process id coincides with the process id of its own, it returns a function value to the print process 112 (404). When the return value of the RNPWRITE message 412 is "0", a transferred data size in bytes is returned as the function value and when the return value is "−1", "−1" is returned as the function value. Also, an error code is set to an external variable errno.

When the operation of the NPR 120 is controlled and detailed error information is queried, the print process 112 calls a npctl function of FIG. 18. The npctl function has functions as shown in FIG. 19 and the print process refers to a parameter to designate which function of the npctl is to be used.

The npctl function has the form of, for example, npctl (sd, PRIOCTLS, &argp)

and is given parameters which are a socket descriptor (sd), a function type (PRIOCTLS), and a head address (&argp) of a field used for transmission of various kinds of information. The field (argp) used for transmission of various kinds of information is defined as struct and in the case of a PRNPSENS of FIG. 19, for example, the field is given as struct nperrsns argp;

The nperrsns struct has such a structure as

```
struct nperrsns{
    int size;    /*byte number of struct*/
    int cmd;     /*command type*/
    struct npreqsns npreqsns;  /*npreqsns
                                 struct*/
};
and the npreqsns struct has such a structure as
struct npreqsns{
    int npage;   /*page numbers for which
                   printing is finished till now*/
    int ncopy;   /*copy counts by which
                   printing is finished till flow*/
    int errsens; /*error code*/
    int errstts; /*detailed error code*/
};
```

The print process 112 sets a number allotted to each function of FIG. 19 to the command type (cmd) and calls a npctl function (717). The npctl function recognizes a value set to the command type (cmd) and executes a requested function. In the case of PRNPSENS, a NPSENS message 718 of FIG. 20 is sent to the NPR controlling daemon 115.

The NPSENS message 718 has a format as shown in FIG. 14 which consists of a message code 0Dh for identifying the kind of a message, a message length for indicating the number of bytes of the message, and a command issuing process id for indicating a process id of the print process 112.

The message recognizing unit 211 of the NPR controlling daemon 115 receives the NPSENS message 718, recognizes the kind of the command and invokes the NPR controlling unit 214 for processing a control system command message sent under the direction of the npctl function.

The NPR controlling unit 214 recognizes in accordance with the command type cmd) that the message is the NPSENS 718 and sends a REQUEST SENSE command 719 of FIG. 22A to the NPR 120.

When receiving the REQUEST SENSE command 719, the NPR 120 sends the present printer status as sense data 720 and subsequently sends a GOOD status 721 of FIG. 23.

The NPR controlling unit 214 receives the sense data 720 and GOOD status 721, stores the sense data 720 in the sense data table 217 and sends a RNPSENS message 722 to the npctl function.

The RNPSENS message 722 has a format as shown in FIG. 15 which consists of a message code 0Dh for identifying the kind of a message, a message length for indicating the number of bytes of the message, a command issuing process id for indicating a process id of the print process 112, a return value for indicating whether the command ends normally, an error code for indicating a cause of an error, and detailed error information. The aforementioned npregsns struct is copied as the detailed error information.

When receiving the RNPSENS message 722, the npctl function confirms the contents of the RNPSENS message 722 and when the message code is 0Dh and the command issuing process id coincides with the process id of its own, it writes information in a field designated in accordance with the parameter &argp, returns the return value to the print process 112 (723), and sets the error code in the external variable errno.

Structurally, the NPR controlling daemon 115 may dispense with the sense data table 217. In this case, each time that the NPR controlling unit 214 is requested to perform a control operation using sense data, the NPR controlling unit 214 sends a REQUEST SENSE command to the NPR 120 to obtain the sense data.

The individual functions of the npctl function shown in FIG. 19 are processed in accordance with a similar sequence to that for PRNPSENS so as to control the operation of the NPR 120 in accordance with the sequence shown in FIGS. 5 to 8 and query information such as detailed error information.

The sequence of each function will now be described with reference to FIGS. 5 to 8.

Denoted by PRNPSTTS is a function to inquire as to the latest status of the printer. The print process 112 calls the npctl function by designating a PRNPSTTS by means of a parameter (501) and the npctl function sends a NPSTTS message 502 of FIG. 20 to the NPR controlling daemon 115. The NPR controlling unit 214 sends a REQUEST SENSE command 503 of FIG. 22A to the NPR 120 and receives sense data 504 and a GOOD status 505 from the NPR 120. The NPR controlling unit 214 updates the sense data table 217 and sends a RNPSTTS message 506 to the npctl function. The npctl function returns information on the latest status of the printer to the print process 112 by referring to a function value and a parameter (507).

Denoted by PRNPENDCHK is a function to instruct outputting of all print data stored in a buffer of the NPR 120 and confirm the end of printing. When the print process 112 calls the npctl function by designating a PRNPENDCHK by means of a parameter (508), the npctl function sends a NPENDCHK message 509 of FIG. 20 to the NPR controlling daemon 115. The NPR controlling unit 214 sends a FLUSH BUFFER command 510 of FIG. 22A to the NPR 120 to instruct it to output all print data. When the NPR 120 prints all print data and completes outputting thereof, it sends a GOOD status 511 to the NPR controlling daemon 115. When receiving the GOOD status 511, the NPR controlling unit 214 sends a RNPENDCHK message 512 to the npctl function. The npctl function returns information on a print end status by referring to a function value and a parameter (513).

Figure 24:
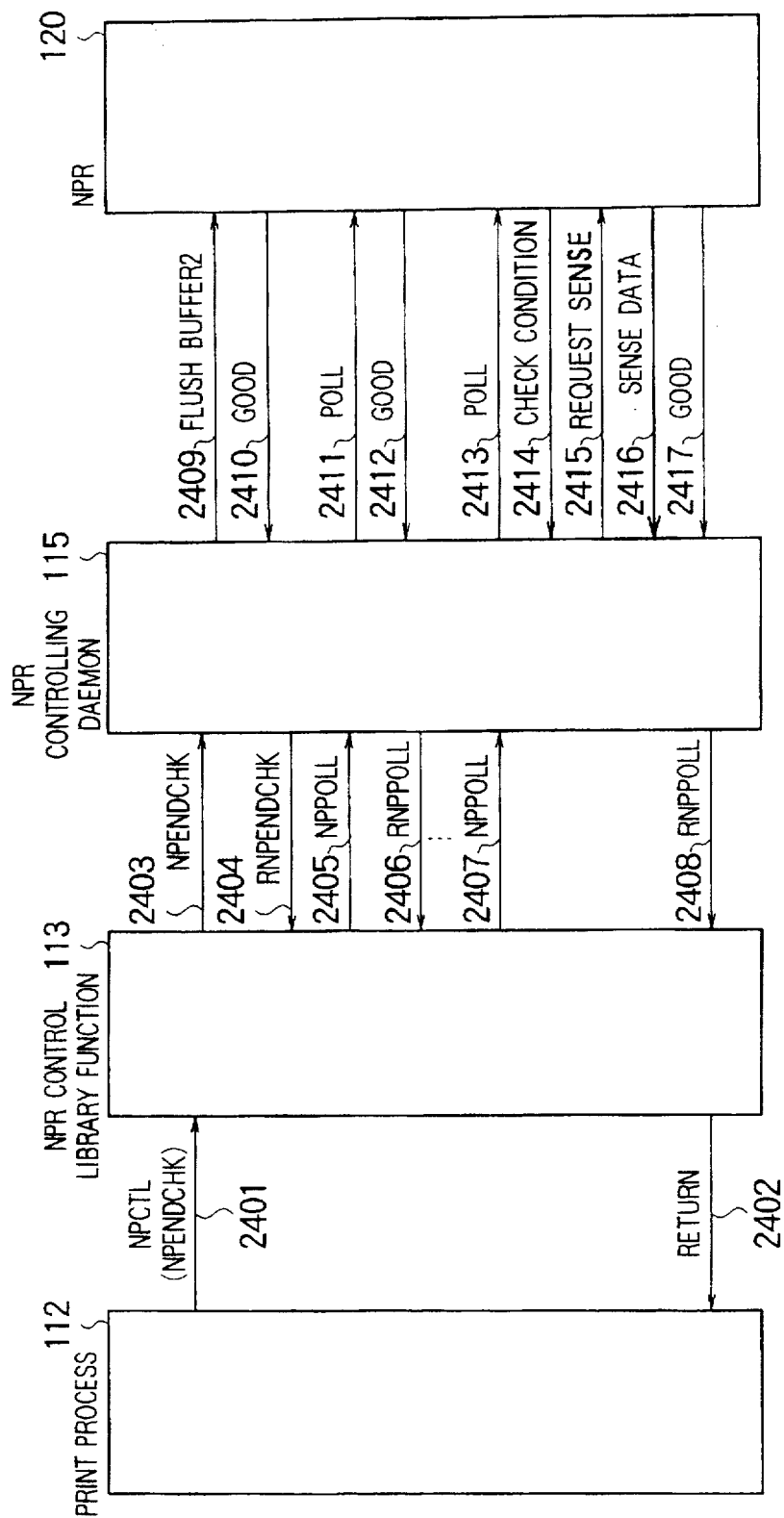
FIG. 24 is a diagram showing an example of the message sequence when a print process issues a npctl (NPENDCHK).

Alternatively, upon receipt of the NPENDCHK message 509, the NPR controlling unit 214 may proceed in accordance with the sequence as shown in FIG. 24.

The npctl function sends a NPENDCHK message 2403 of FIG. 20 to the NPR controlling daemon 115. The NPR controlling unit 214 then sends a FLUSH BUFFER 2 command 2409 of FIG. 22A to the NPR 120 to instruct it to output all print data. Responsive to the FLUSH BUFFER 2 command 2409, the NPR 120 immediately sends a GOOD status 2410 to start outputting all print data. When receiving the GOOD status 2410, the NPR controlling daemon 115 sends a RNPENDCHK message 2404 to the NPR control library 113. The npctl function of the NPR control library 113 receives the RNPENDCHK message 2404 and performs polling by using a NPPOLL message of FIG. 20. Namely, the npctl function sends the NPPOLL message at intervals of constant time (2405, 2407) to query how the status of the NPR 120 changes. When receiving the NPPOLL message, the NPR controlling daemon 115 sends a POLL command of FIG. 22B to the NPR 120 (2411, 2413). Upon receipt of the POLL command, the NPR 120 checks whether its status is changed. If changed, the NPR 120 sends a CHECK CONDITION status 2414. Receiving the CHECK CONDITION status 2414, the NPR controlling daemon 115 sends a REQUEST SENSE 2415 to the NPR 120 and receives sense data 2416 from the NPR 120 so as to be informed of completion of outputting of all print data or generation of an error. Being informed of the completion of outputting of all print data by means of the RNPPOLL message 2408, the NPR control library 113 returns (2402).

Denoted by PRRESERVE is a function to perform setting for reservation of print data in the buffer 219 during generation of an error or suspension of printing. Various modes can be set in the reserve mode, including a PERSV mode for reserving print data in the buffer 219 when an error which can be recovered by the operator, for example, a paper lacking error or a CANRSV mode for reserving print data during suspension of printing occurs. Both the modes can be set simultaneously. If neither mode is set, print data in the buffer 219 is discarded when an error occurs or printing is suspended.

When the print process 112 calls the npctl function by designating a PRRESERVE by means of a parameter (514), the npctl function sends a NPRESERVE message 515 of FIG. 20 to the NPR controlling daemon 115. The NPR controlling unit 214 sets a mode in the reserve mode flag 222 and sends a RNPRESERVE message 516 of FIG. 21 to the npctl function. The npctl function returns set information to the print process 112 by referring to a function value and a parameter (517).

Denoted by PRRECEIVE is a function to inquire as to the number of bytes of print data received by the buffer 219 under the direction of a npwrite function. When the print process 112 calls the npctl function by designating a PRRECEIVE by means of a parameter (518), the npctl function sends a NPRECEIVE message 519 of FIG. 20 to the NPR controlling daemon 115. The NPR controlling unit 214 inquires as to a byte number of print data received from the memory unit for storing receive data size in bytes 223 and sends a RNPRECEIVE message 520 of FIG. 21 to the npctl function. The npctl function returns information on the byte number to the print process 112 by referring to a function value and a parameter (521).

Denoted by PRRESTART is a function to instruct transfer of print data reserved in the buffer 219 to the NPR 120. When the print process 112 calls a npctl function b designating a PRRESTART by means of a parameter (601), the npctl function sends a NPRESTART message 602 of FIG. 20 to the NPR controlling daemon 115. The NPR controlling unit 214 recognizes from the contents of the buffer management unit 220 whether print data is present in the buffer 219 and if present, sends the print data to the NPR 120. After the print data is sent, the NPR controlling unit 214 sends a PNPRESTART message 607 to the npctl function. The npctl function returns information on a result of transfer to the print process 112 by referring to a function value and a parameter (608). The print data is transferred in accordance with the following sequence.

(1) The NPR controlling unit 214 sends a PRINT command to the NPR 120.
(2) When the NPR 120 is ready to receive print data, it sends a RTR status to the NPR controlling daemon 115.
(3) The NPR controlling unit 214 instructs the printing data transfer processing unit 215 to send the print data, and the printing data transfer processing unit 215 sends print data 605 to the NPR 120.
(4) When receiving the print data normally, the NPR 120 sends a GOOD status 606 to the NPR controlling daemon 115.

Figure 25:
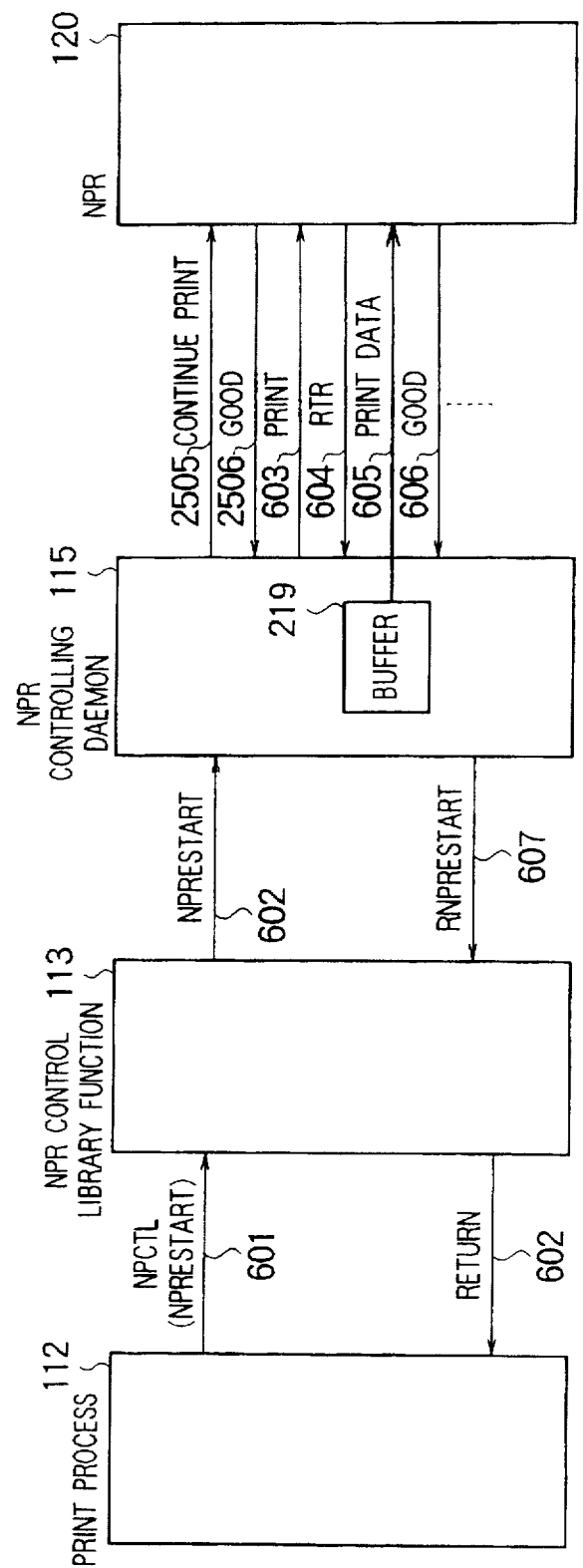
FIG. 25 is a diagram showing an example of the message sequence when the print process issues a npctl (NPRESTART).

Upon receipt of the NPRESTART message 602, the NPR controlling unit 214 may proceed in accordance with the sequence as shown in FIG. 25.

When receiving a NPRESTART message 602, the NPR controlling unit 214 sends a CONTINUE PRINT command 2505 of FIG. 22B to the NTR 120. Receiving the CONTINUE PRINT command 2505, the NPR 120 resumes printing and sends a GOOD status 2506 to the NPR controlling daemon 115. Upon receipt of the GOOD status 2506, the NPR controlling unit 214 recognizes from the contents of the buffer management unit 220 whether print data is present in the buffer 219 and if present, it sends the print data to the NPR 120 in accordance with the aforementioned (1) to (4) sequence steps.

Denoted by PRSYNCHRO is a function to set a synchronous/asynchronous mode of a npwrite function. When the print process 112 calls the npctl function by designating a PRSYNCHRO by means of a parameter (609), the npctl function sends a NPSYNCHRO message 610 of FIG. 20 to the NPR controlling daemon 115. The NPR controlling unit 214 sets either one of synchronous and asynchronous modes in the synchronization mode flag 218 and sends a RNPSYNCHRO message 611 of FIG. 21 to the npctl function. The npctl function returns information on setting of the synchronous/asynchronous mode to the print process 112 by referring to a function value and a parameter (612).

Denoted by PRCANCEL is a function to suspend the transfer of print data. When the print process 112 calls the npctl function by designating a PRCANCEL by means of a parameter (613), the npctl function sends a NPCANCEL message 614 of FIG. 20 to the NPR controlling daemon 115. The NPR controlling unit 214 instructs the print data transfer processing unit 215 to suspend the transfer of print data and sends a STOP PRINT command 615 to the NPR 120. As shown in FIG. 22B, the STOP PRINT command is classified, in accordance with the value of a hold bit in the command, into a suspend command (hold bit=1) and a cancel command (hold bit=0). The NPR controlling unit 214 sets the hold bit to "1" and sends a STOP PRINT command 615.

When the print suspend processing is finished, the NPR 120 sends a GOOD status 616 to the NPR controlling daemon 115. Receiving the GOOD status 616, the NPR controlling unit 214 sends a RNPCANCEL message 617 to the npctl function. The npctl function returns a result of the processing to the print process 112 by referring to a function value and a parameter (618).

Denoted by PRCLEAR is a function to clear print data. When the print process 112 calls the npctl function by designating a PRCLEAR by means of a parameter (701), the npctl function sends a NPCLEAR message 702 of FIG. 20 to the NPR controlling daemon 115. The NPR controlling unit 214 initializes the pointer of the buffer management unit 220 to clear print data in the buffer 219 and sets the hold bit of a STOP PRINT command 703 to "0" and sends it to the NPR 120.

When completing the print cancel processing, the NPR 120 sends a GOOD status 704 to the NPR controlling daemon 115. Receiving the GOOD status 704, the NPR controlling unit 214 sends a RNPCLEAR message 705 to the npctl function. The npctl function returns a result of the processing to the print process 112 by referring to a function value and a parameter (706).

Denoted by PRPAPERSTTS is a function to inquire the status of printing paper in a paper inputting/outputting unit (not shown). When the print process 112 calls the npctl function by designating a PRPAPERSTTS by means of a parameter (707), the npctl function sends a NPPAPERSTTS message 708 of FIG. 20 to the NPR controlling daemon 115. Receiving the NPPAPERSTTS message 708, the NPR controlling unit 214 sends a REQUEST SENSE command 709 to the NPR 120.

The NPR controlling unit 214 receives from the NPR 120 sense data 710, which contains a status of the paper inputting/outputting unit of the NPR 120, an operational status thereof and detailed error information, and a GOOD status 711, updates the sense data table 217 and then sends a MODE SENSE command 712 to the NPR 120. Finally, the NPR controlling unit 214 receives MODE SENSE data 713 and a GOOD status 714 and sends a RNPPAPERSTTS message 715 to the npctl function. The npctl function returns the status of printing paper to the print process 112 by referring to a function value and a parameter (716).

Denoted by PRNPINQ is a function to inquire as to NPR device information. The NPR 120 has, as device information, printer type name, resolution, printer name, font and page description name and sends the information to the NPR controlling daemon 115 as INQUIRY data. When the print process 112 calls the npctl function by designating a PRNPINQ by means of a parameter (801), the npctl function sends a NPINQ message 802 of FIG. 20 to the NPR controlling daemon 115. Receiving the NPINQ message 802, the NPR controlling unit 214 sends an INQUIRY command 803 to the NPR 120. The NPR controlling unit 214 receives INQUIRY data 804 and a GOOD status 805 from the NPR 120, copies NPR device information obtained from the INQUIRY data 804 into a RNPINQ message 806 and sends the copied information to the npctl function. The npctl function returns the status of printing paper to the print process 112 by referring to a function value and a parameter (807).

The NPR 120 executes printing while logically managing printing pages by the aid of numbers assigned to pages. Denoted by PRRESETPAGEN is a function to reset logical page numbers managed by the NPR 120. When the print process 112 calls the npctl function by designating a PRRE-SETPAGEN by means of a parameter (808), the npctl function sends a NPRSTPAGEN message 809 to the NPR controlling daemon 115.

Receiving the NPRSTPAGEN message 809, the NPR controlling unit 214 sends a PRINT 3 command 810 to the NPR 120. The PRINT 3 command 810 has a print data field and is a command which can instruct resetting of logical page number by a sub-command at a head of the print data field.

When receiving a RTR status 811 from the NPR 120, the NPR controlling unit 214 sends a sub-command 812 to instruct the NPR 120 to reset logical page number. The NPR controlling unit 214 receives a GOOD status 813 from the NPR 120 and sends a RNPRSTPAGEN message 814 to the npctl function. The npctl function returns a result of the processing to the print process 112 by referring to a function value and a parameter (815).

The sequence for controlling the NPR has been described but functions other than those described previously can be realized by combining NPR control protocol commands shown in FIGS. 22A and 22B and can be registered as new npctl functions.

When the print process 112 completes printing by the NPR 120 and controlling thereof through a series of function calls, it finally calls the npclose of the library functions of FIG. 18 (405). The npclose function sends a NPCLOSE message 413 to the NPR controlling daemon 115.

The NPCLOSE message has a format which is similar to that of the NPOPEN message and which consists of a message code 02h for identifying the kind of a message, a message length for indicating the number of bytes of the message and a command issuing process id for indicating a process id of the print process 112.

Upon receipt of the NPCLOSE message 413, the NPR controlling daemon 115 invokes the close processing unit 213. The close processing unit 213 confirms that all of the processings instructed by the print process 112 are finished and sends an END SESSION 2 command 422 to the NPR 120 to effect disconnection (423).

Upon receipt of the END SESSION 2 command 422, the NPR 120 turns off the USED flag, and completes disconnection (423).

When the NPR 120 is disconnected, the close processing unit 213 sends a RNPCLOSE message 414 to the npclose function to disconnect the UNIX domain (425).

In an alternative, sending of the RNPCLOSE message 414 to the npclose function may be carried out immediately after the close processing unit 213 receives the NPCLOSE message 413, the UNIX domain may subsequently be disconnected and the completion of all of the processings instructed by the print process 112 may be confirmed, and the END SESSION 2 command 422 may be sent to the NPR 120 to effect disconnection.

The RNPCLOSE message 414 has a format which is similar to that of the RNPOPEN and which consists of a message code 02h for identifying the kind of a message, a message length for indicating the number of bytes of the message, a command issuing process id for indicating a process id of the print process 112 which has issued the NPCLOSE message 413, a return value for indicating whether the command ends normally, and an error code for indicating a cause of an error.

When receiving the RNPCLOSE message 414, the npclose function disconnects the UNIX domain (425). Subsequently, the npclose function checks the contents of the RNPCLOSE message 414 and if the message code is 02h and the command issuing process id coincides with the process id of its own, it returns a return value to the print process 112 as a function value (406) and sets an error code in an external variable errno.

When the npclose function is returned normally, the print process 112 ends causing the NPR 120 to execute printing.

In the event that information such as an error is generated during printing pursuant to the sequence of FIGS. 4 to 8, the NPR 120 sends either one of CHECK CONDITION, CHECK CONDITION WITH GOOD FLAG, BUSY and USED statuses as shown in FIG. 23 to the NPR controlling daemon 115 in accordance with the contents of the information. The NPR controlling daemon 115 recognizes these statuses to ask the NPR 120 for information or inform the NPR control library function 113 of the information issued from the NPR 120. Also, the NPR controlling daemon 115 turns on the error flag when an error is detected and turns it off when the error is recovered.

The print process 112 is allowed to make use of a function of the NPR control library 113 to detect details of a cause of an error generated in the NPR 120. In the case where the intervention of the user is necessary to remove the cause of the error, the print process 112 informs the user of that fact but in the case where the error is recoverable without resort to the intervention of the user, the print process 112 can assist in automatic recovery without informing the user of the error. The recoverable error may be exemplified by such an error that a font, a document or an emulation program instructed by a print job is not provided in the NPR 120 and printing cannot proceed. In the event that this type of error is generated, the print process 112 automatically sends the font, document or emulation program instructed by the print job to the NPR 120 and thereafter sends the print job again. When an error cannot be recovered without resort to the intervention of the user, the host computer 110 causes a display such as a CRT to display the generation of the error or causes. Alternatively, it causes an acoustic means to inform the user of the error.

Generally, the device driver has great dependency on the type of apparatus and different types of device drivers are needed for different types of computers. But, according to the present first embodiment, the NPR control library and NPR daemon can be realized using the system call standardized in the UNIX operation system and hence, the NPR control library and the NPR controlling daemon which are the same for different types of apparatus can be built therein to cause the NPR to execute printing and a remote print system utilizing the NPR 120 can be constructed with ease.

Figure 16:
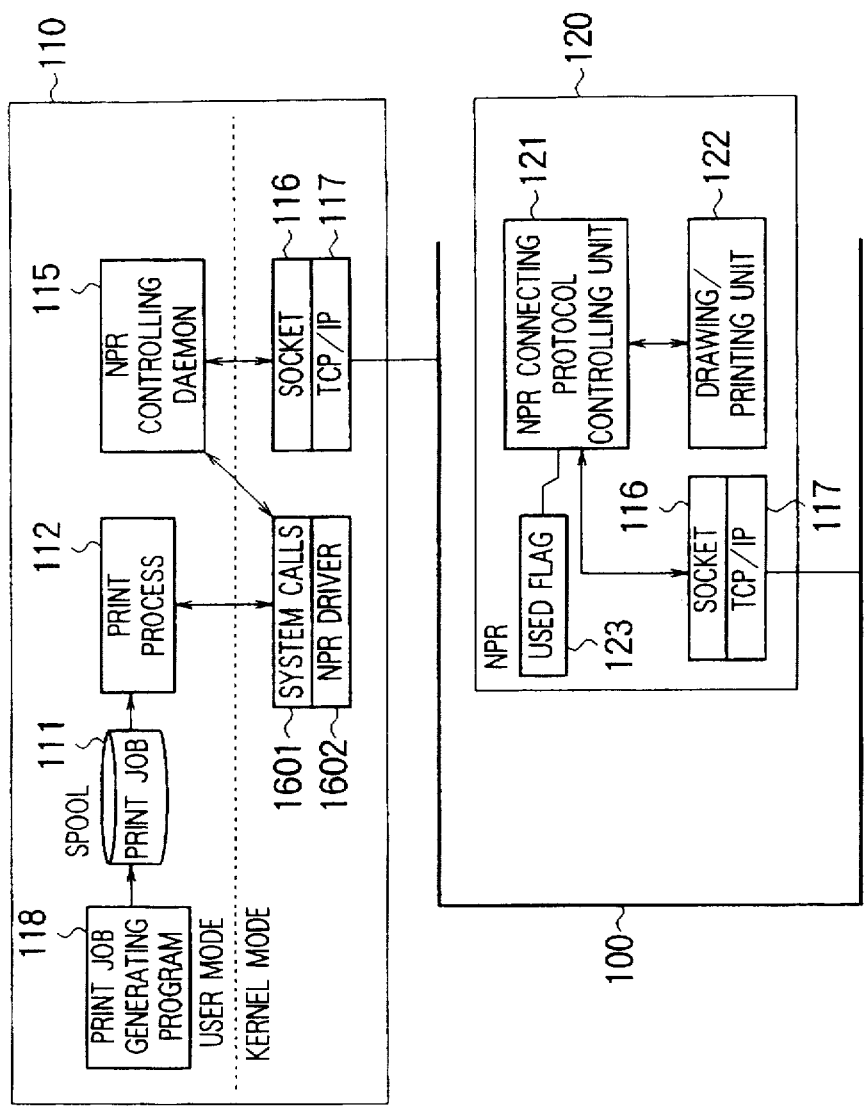
FIG. 16 is a block diagram showing the construction of a remote print system according to a second embodiment of the present invention.
Figure 17:
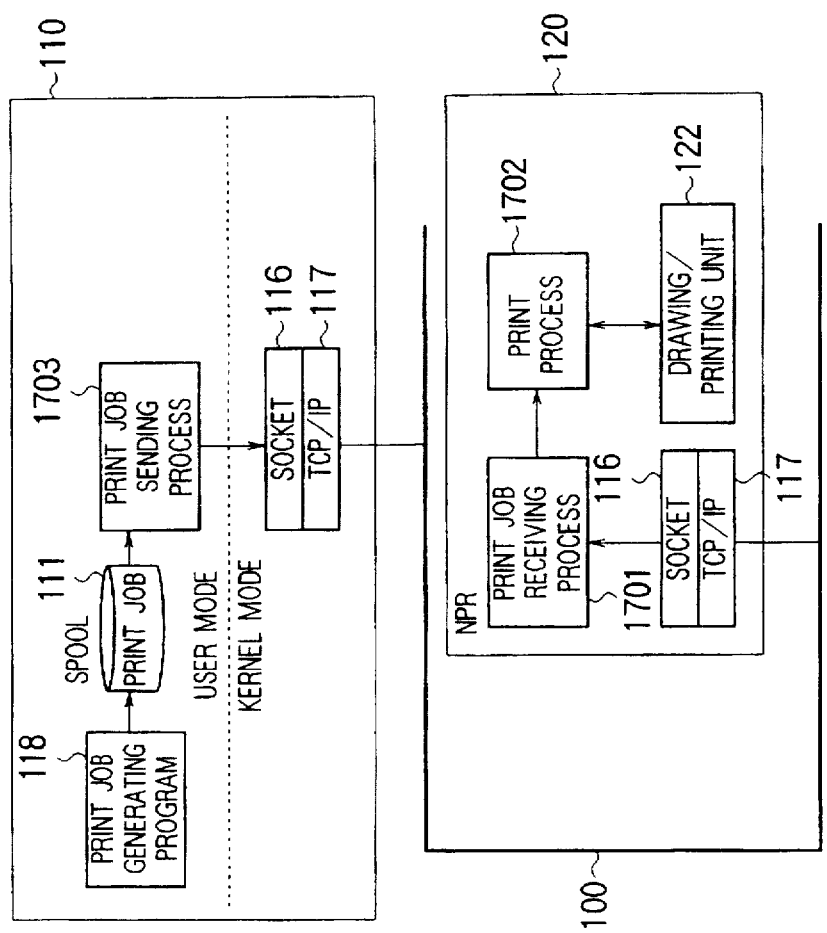
FIG. 17 is a block diagram showing the construction of a conventional remote print system.

FIG. 16 is a block diagram showing the construction of a remote print system according to a second embodiment of the present invention.

The second embodiment of the present invention will now be described with reference to FIG. 16.

The present embodiment uses system calls 1601 and a NPR driver 1602 in place of the NPR control library 113 and IPC 114.

Like the conventional printer device driver, a print process 112 utilizes open, close, write and ioctl system calls 1601 and issues these system calls 1601 to the NPR driver 1602 to cause a NPR 120 to execute printing. The ioctl has the same function as that of the ioctl in the first embodiment.

By utilizing a kernel input/output support routine for transferring a message between user and kernel modes, the NPR driver 1602 sends a command message as shown in FIG. 20 to a NPR controlling daemon 115 so as to inform the NPR controlling daemon 115 of a control operation requested by the print process 112.

The NPR controlling daemon 115 receives the command message from the print process 112 and controls the operation of the NPR 120 in accordance with the command message under the direction of the NPR connecting protocol as in the case of the first embodiment. When completing the request processing in accordance with the command message, the NPR controlling daemon 115 sends a response message shown in FIG. 21 to the NPR driver 1602. The NPR driver takes information out of the response message and returns a result of the processing to the print process 112 as return values of the system calls and a parameter.

According to the second embodiment, like the conventional printer device driver, the print process 112 can cause the NPR 120 to execute printing through the interface. Accordingly, the existing application program and print process are allowed to utilize the NPR 120 by merely selecting a printer driver for the NPR 120 without changing a source code of its own.

While the foregoing embodiments have been described as using the computer carrying the UNIX operating system as the host computer 110, the NPR 120 can be controlled through the use of similar function and construction even when a computer carrying other operating system than the UNIX.

According to the present invention, the host computer can perform such fine operations as achievable in printing based on the local printer, for example, suspension, resumption and cancellation of printing, can know details of device information on the printer such as letter font, emulation of page description language, precision of printing and paper size, details of power supply interruption and stand-by status, details of errors such as lack of paper, paper jam, lack of toner, cover open, misprint, lack of font, non-coincidence of emulation, and details of operation status of, for example, a paper cassette selected presently and a paper outputting tray selected presently, so as to inform the user of host computer 110 of a cause of an error in the event that normal printing is not carried out and undertake the error recovery processing such as resending of a print job, whereby even when the NPR is located remote from the host computer, the user of the host computer can advantageously check, with ease, print conditions such as the operational status of the network printer and detailed error information. Further, according to the present invention, the user of the host computer can initiate error recovery processing such as removal of the cause of an error and re-sending of a print job in accordance with the cause of the error to eliminate such a problem that the NPR keeps waiting for removal of the cause of the error for an interval of time, during which the NPR cannot be used to execute printing, thereby ensuring that the print system can be run efficiently to advantage.

Further, according to the present invention, in contrast to the printer driver which operates in the kernel mode and therefore has large dependency on the type of apparatus carrying the printer driver, the NPR control library and NPR controlling daemon can be used to realize the printer driver in the form of a user process which less depends on the type of apparatus, so that the NPR control library and NPR daemon which are the same for different types of apparatus can be carried on different types of apparatus to cause the NPR to execute printing, thereby making it possible to easily construct a remote print system having a NPR which is common to different types of apparatus.

Furthermore, according to the present invention, the interface through which the process of the host computer causes the NPR to perform printing can be identical with the interface through which the printer drivers cause the local printer to execute printing in the construction wherein the NPR driver is provided in place of the NPR control library in the remote print system and the process of the host computer requesting printing can cause the network printer to execute printing under the direction of system calls similar to those for causing the local printer connected to the host computer to execute printing, so that there is no need of preparing an application program which performs document printing by utilizing interfaces which are different for different cases of causing the NPR to execute printing and causing the local printer to execute printing and a single program can be used to cause either the NPR or the local printer to execute printing, thereby ensuring that the network printer can advantageously be allowed to execute printing without affecting the conventional application system and other systems.

We claim:

1. A remote print system comprising:

a network;

a host computer connected to the network; and a network printer (NPR) connected to the network;

wherein the host computer includes an NPR control library serving as an interface to the network printer, the NPR control library providing a plurality of functions and converting the functions to corresponding command messages, and an NPR controlling daemon which controls the network printer in accordance with command messages from the NPR control library;

wherein the network printer includes an NPR connecting protocol controlling unit which communicates with the NPR controlling daemon through the network in accordance with a printer control protocol so as to control the network printer to perform functions under control of the NPR controlling daemon;

wherein the command messages from the NPR control library include a command message specifying an amount of data to be transferred from the NPR control library to the NPR controlling daemon;

wherein when the NPR controlling daemon receives the command message specifying an amount of data to be transferred from the NPR control library to the NPR controlling daemon, the NPR controlling daemon sends a message to the NPR control library indicating whether the NPR controlling daemon can accept the amount of data specified by the command message; and wherein when the message sent by the NPR controlling daemon to the NPR control library indicates that the NPR controlling daemon can accept the amount of data specified by the command message, the NPR control library sends the amount of data specified by the command message to the NPR controlling daemon, and the NPR controlling daemon sends the data to the NPR using an NPR connecting protocol, confirms whether the NPR has received the data normally, and after confirming that the NPR has received the data normally, sends a message to the NPR control library indicating that data transfer has been completed normally.

2. A remote printing method for use in a remote print system, the remote print system including a network, a host computer connected to the network, and a network printer (NPR) connected to the network, the host computer including an NPR control library serving as an interface to the network printer, the NPR control library providing a plurality of functions and converting the functions to corresponding command messages, and an NPR controlling daemon which controls the network printer in accordance with command messages from the NPR control library, the network printer including an NPR connecting protocol controlling unit which communicates with the NPR controlling daemon through the network in accordance with a printer control protocol so as to control the network printer to perform functions under control of the NPR controlling daemon, the remote printing method comprising the steps of:

providing the NPR control library with a command message specifying an amount of data to be transferred from the NPR control library to the NPR controlling daemon;

sending, from the NPR control library to the NPR controlling daemon, the command message specifying an amount of data to be transferred from the NPR control library to the NPR controlling daemon;

when the NPR controlling daemon receives the command message specifying an amount of data to be transferred from the NPR control library to the NPR controlling daemon, sending, from the NPR controlling daemon to the NPR control library, a message to the NPR control library indicating whether the NPR controlling daemon can accept the amount of data specified by the command message; and when the message sent to the NPR control library from the NPR controlling daemon indicates that the NPR controlling daemon can accept the amount of data specified by the command message, sending, from the NPR control library to the NPR controlling daemon, the amount of data specified by the command message, sending, from the NPR controlling daemon to the NPR, the data using an NPR connecting protocol, confirming, by the NPR controlling daemon, whether the NPR has received the data normally, and after confirming, by the NPR controlling daemon, that the NPR has received the data normally, sending, from the NPR controlling daemon to the NPR control library, a message indicating that data transfer has been completed normally.

* * * * *